US011640451B2

(12) United States Patent
Nam et al.

(10) Patent No.: US 11,640,451 B2
(45) Date of Patent: May 2, 2023

(54) ELECTRONIC DEVICE AND METHOD FOR PERFORMING BIOMETRIC AUTHENTICATION FUNCTION AND INTELLIGENT AGENT FUNCTION USING USER INPUT IN ELECTRONIC DEVICE

(71) Applicant: Samsung Electronics Co., Ltd., Suwon-si (KR)

(72) Inventors: Kihyung Nam, Suwon-si (KR); Keunyoung Park, Suwon-si (KR); Jaewook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

(21) Appl. No.: 16/858,127

(22) Filed: Apr. 24, 2020

(65) Prior Publication Data

US 2020/0342081 A1 Oct. 29, 2020

(30) Foreign Application Priority Data

Apr. 25, 2019 (KR) .................. 10-2019-0048361

(51) Int. Cl.
*G06F 21/32* (2013.01)
*G06N 20/00* (2019.01)
(Continued)

(52) U.S. Cl.
CPC ............ *G06F 21/32* (2013.01); *G06F 9/4881* (2013.01); *G06N 20/00* (2019.01); *G06F 1/1641* (2013.01)

(58) Field of Classification Search
CPC ...... G06F 21/32; G06F 9/4881; G06F 1/1641; G06F 3/0487; G06F 21/31;
(Continued)

(56) References Cited

U.S. PATENT DOCUMENTS

2005/0085217 A1* 4/2005 Lim .................. H04M 1/66
455/410
2011/0080260 A1* 4/2011 Wang .................. G06F 21/32
340/5.83
(Continued)

FOREIGN PATENT DOCUMENTS

CN 106648576 A 5/2017
CN 107426249 A 12/2017
(Continued)

OTHER PUBLICATIONS

International Search Report and Written Opinion of the International Searching Authority in connection with International Application No. PCT/KR2020/005378 dated Jul. 29, 2020, 10 pages.
(Continued)

*Primary Examiner* — Roberto W Flores

(57) ABSTRACT

An electronic device include: a display, an input unit, at least one processor, and a memory. The input unit includes at least one biometrics sensor and the memory includes instructions. The processor is configured to perform user authentication based on biometric sensing information obtained through the at least one biometrics sensor in response to an input to the input unit. In response to successfully performing the user authentication, the processor is configured to identify whether a duration of the input exceeds a first threshold time. The processor is configured to perform a first function when the duration is less than or equal to the first threshold time. The processor is also configured to perform a second function when the duration exceeds the first threshold time.

18 Claims, 24 Drawing Sheets

(51) Int. Cl.
*G06F 9/48* (2006.01)
*G06F 1/16* (2006.01)

(58) Field of Classification Search
CPC ........ G06F 3/048–04897; G06N 20/00; H04L 63/0861; G06V 40/12–1394
See application file for complete search history.

(56) References Cited

U.S. PATENT DOCUMENTS

| | | |
|---|---|---|
| 2013/0263252 A1 | 10/2013 | Lien et al. |
| 2014/0341447 A1 | 11/2014 | Cho et al. |
| 2015/0074615 A1 | 3/2015 | Han et al. |
| 2015/0324627 A1 | 11/2015 | Cho et al. |
| 2016/0026381 A1 | 1/2016 | Kim et al. |
| 2017/0046025 A1* | 2/2017 | Dascola .............. G06F 3/04886 |
| 2017/0300700 A1 | 10/2017 | Li et al. |
| 2017/0351850 A1* | 12/2017 | Jin .......................... G06F 21/32 |
| 2017/0357661 A1* | 12/2017 | Hornkvist ............. G06F 16/148 |
| 2018/0046347 A1 | 2/2018 | Wang |
| 2018/0173930 A1 | 6/2018 | Han et al. |
| 2019/0019177 A1 | 1/2019 | Lee et al. |

FOREIGN PATENT DOCUMENTS

| | | |
|---|---|---|
| CN | 107480501 A | 12/2017 |
| KR | 10-2014-0134459 A | 11/2014 |
| KR | 10-2016-0012779 A | 2/2016 |
| KR | 10-2018-0099423 A | 9/2018 |

OTHER PUBLICATIONS

European Search Report in connection with European Application No. 20171353.4 dated Aug. 5, 2020, 7 pages.

* cited by examiner

ELECTRONIC DEVICE AND METHOD FOR PERFORMING BIOMETRIC AUTHENTICATION FUNCTION AND INTELLIGENT AGENT FUNCTION USING USER INPUT IN ELECTRONIC DEVICE

CROSS-REFERENCE TO RELATED APPLICATION

This application is based on and claims priority under 35 U.S.C. 119 to Korean Patent Application No. 10-2019-0048361, filed on Apr. 25, 2019, in the Korean Intellectual Property Office, the disclosure of which is herein incorporated by reference in its entirety.

BACKGROUND

1. Field

Various embodiments relate to inputs for performing biometric authentication and intelligent agent functions in an electronic device.

2. Description of Related Art

With the recent remarkable development of information and communication technology, semiconductor technology, and the like, the spread and use of electronic devices, which provide biometric authentication functions using various biometrics sensors provided therein and intelligent agent functions by artificial intelligence technology, have rapidly increased.

Biometric authentication is an authentication method that authenticates a user by using unique biometric information of an individual such as fingerprints, irises, sweat gland structures, blood vessels, etc., which are different for each user. Personal features such as face shapes, voices, fingerprints, eyeballs, etc., cannot be used by the theft or duplication thereof by others, as is the case with keys or passwords, and they are widely used in security because there is no risk of being changed or lost. In particular, follow-up tracking for a user may be possible, thereby establishing a safe system in terms of management. As examples of using such biometrics, fingerprints, voices, faces, irises, palms, vein distributions, and the like may be given. Recently, many multimodal biometrics that use two or three recognition methods together to compensate for shortcomings and increase accuracy have been developed. Biometrics using gait, body odor, ear shape, and genetic information have been studied.

The intelligent agent functions may be functions mounted in an electronic device as an example of an artificial intelligence (AI) system. The artificial intelligence system is a computer system that implements human-level intelligence, and may be a system in which a machine learns and determines by itself and whose recognition rate is improved along with an increase in the number of times the system is used. The AI technology consists of machine learning (deep learning) technology that uses algorithms to classify/learn characteristics of input data by themselves and elemental technology that simulates the functions of cognition and judgment of the human brain using machine learning algorithms. The elemental technology may include, for example, at least one of linguistic understanding technology that recognizes human language/character, visual understanding technology that recognizes things as in human vision, reasoning/prediction technology that logically infers and predicts information, knowledge expression technology that processes human experience information as knowledge data, and motion control technology that controls autonomous driving of vehicles and movement of robots.

SUMMARY

A plurality of functions of the electronic device may be executed by separate inputs. A user may separately perform, on the electronic device, an input for biometric authentication, an input for executing a first function (e.g., an intelligent agent function), or an input for executing a second function (e.g., functions other than the intelligent agent). It may be convenient if a biometric authentication function, an intelligent agent function, and/or other functions are executed together by a single input of the user in the electronic device.

In general, when the electronic device is changed from a lock state to an unlock state after success of user authentication by the biometric authentication function, the electronic device may execute an intelligent agent function, thereby preventing the intelligent agent function from being stolen by someone other than the user.

When the biometric authentication function and the intelligent agent function are respectively executed by a single input, a difference between the execution time of the biometric authentication function and the intelligent agent function may be generated. In a case in which the biometric authentication function and the intelligent agent function are respectively executed by a single input, when the biometric authentication function is executed later than the intelligent agent function, there may be a situation where the intelligent agent function must be executed in a lock state (a state in which user authentication based on biometric authentication is not performed), and when the intelligent agent function is executed while the user authentication is not performed, the intelligent agent function may be stolen by someone other than the user.

According to various embodiments, it is possible to provide an electronic device that includes an input unit for simultaneously enabling an input for performing a biometric authentication function and an input for performing an intelligent agent function, and a method of performing the biometric authentication function and the intelligent agent function based on a user input in the electronic device.

According to various embodiments, it is possible to provide an electronic device that performs an intelligent agent function when user authentication by a biometric authentication function succeeds while performing the biometric authentication function and the intelligent agent function by a single input, and a method of performing the biometric authentication function and the intelligent agent function based on a user input in the electronic device.

According to various embodiments, it is possible to provide an electronic device that performs an intelligent agent function or other functions based on a duration of an input when user authentication by a biometric authentication function succeeds while performing the biometric authentication function and the intelligent agent function by a single input, and a method of performing the biometric authentication function and the intelligent agent function based on a user input in the electronic device.

An electronic device according to various embodiments may include: a display; an input unit configured to include at least one biometrics sensor; at least one processor configured to be operatively connected to the display and the input unit; and a memory configured to be operatively connected to the at least one processor, wherein the memory stores instructions that cause, when executed, the at least one processor to: perform user authentication based on biometric sensing information obtained through the at least one biometrics sensor in response to an input to the input unit in a lock state; and in response to the success of the user authentication, perform a first function when a duration of the input is less than or equal to a first threshold time, and perform a second function when the duration of the input exceeds the first threshold time.

A method of performing a biometric authentication function and an intelligent agent function using an input unit in an electronic device according to various embodiments may include: performing user authentication based on biometric sensing information obtained through at least one biometrics sensor in response to an input to the input unit in a lock state; and in response to success of the user authentication, performing a first function when a duration of the input is less than or equal to a first threshold time, and performing a second function when the duration of the input exceeds the first threshold time.

According to various embodiments, in a storage medium that stores instructions, the instructions may be configured, when executed by at least one circuit, to cause the at least one circuit to perform at least one operation, wherein the at least one operation includes operations of: performing user authentication based on biometric sensing information obtained through at least one biometrics sensor in response to an input to an input unit in a lock state; and in response to success of the user authentication, performing a first function when the duration of the input is less than or equal to the first threshold time, and performing a second function when the duration of the input exceeds the first threshold time.

According to various embodiments, it is possible to simultaneously enable an input for performing a biometric authentication function and an input for performing an intelligent agent function by a single input using the input unit in the electronic device.

According to various embodiments, it is possible to perform an intelligent agent function when user authentication by a biometric authentication function succeeds while performing each of the biometric authentication function and the intelligent agent function by a single input, thereby preventing the intelligent agent function from being performed without user authentication.

According to various embodiments, it is possible to perform an intelligent agent function or other functions based on a duration of an input when user authentication by a biometric authentication function succeeds by a single input, thereby allowing a user to select and perform a function other than the intelligent agent function based on the duration of the input while performing the biometric authentication function by a single input.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, an electronic device according to various embodiments will be described with reference to the accompanying drawings. In the disclosure, the term "user" may indicate a person using an electronic device or a device (e.g., an artificial intelligence electronic device) using an electronic device.

Figure 1:
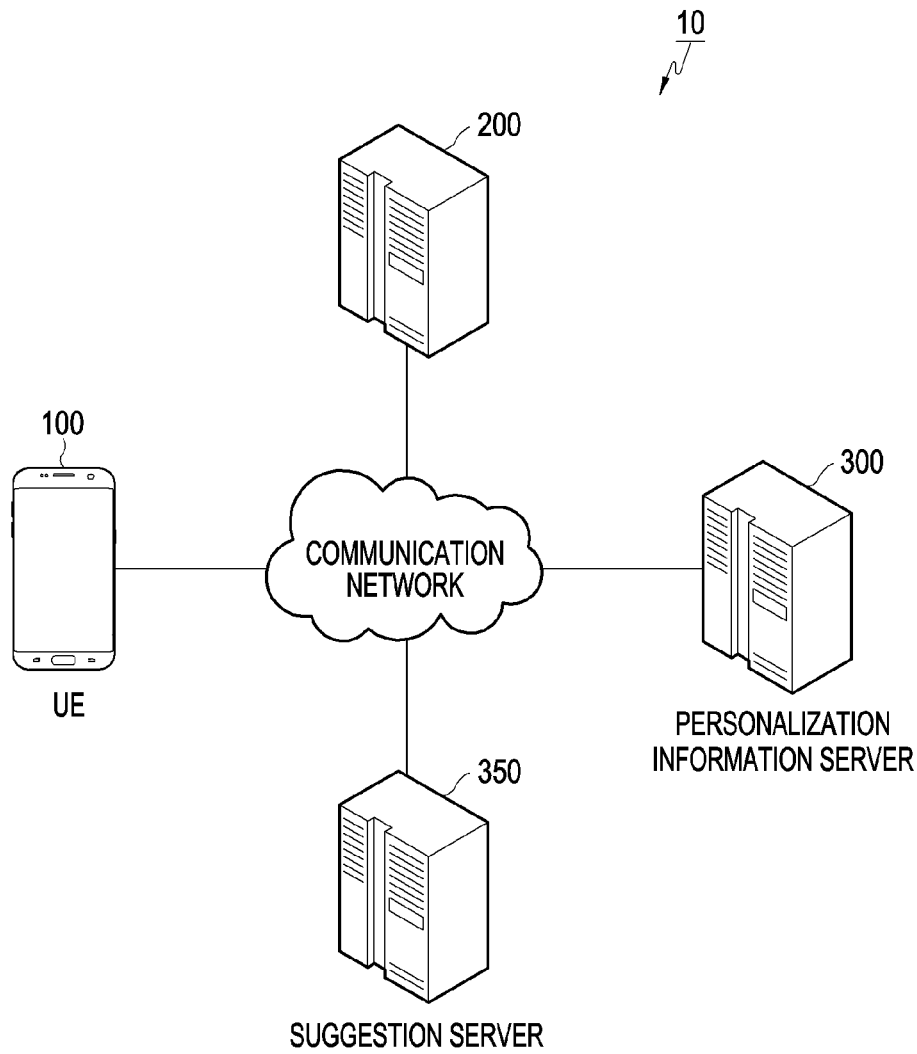
FIG. 1 is a diagram illustrating an integrated intelligence system according to various embodiments.

FIG. 1 is a diagram illustrating an integrated intelligence system according to various embodiments.

Referring to FIG. 1, an integrated intelligence system 10 may include a user equipment (UE) 100, an intelligent server 200, a personalization information server 300, and a suggestion server 350. The UE 100 (hereinafter, also referred to as an "electronic device") of the integrated intelligence system 10 may support the limited use of a voice recognition function in a lock screen state (or a state in which a lock screen is displayed or a lock state). According to various embodiments, when attempting to use a voice recognition function in a lock screen state by using a biosignal (iris or fingerprint) as a second means for releasing a lock screen, the UE 100 of the integrated intelligence system 10 may prevent user's unintended unlocking to provide interface consistency and to improve the security of personal information.

The UE 100 may provide required services to a user through an app (or an application program or an application) (e.g., an alarm, a message, a picture (gallery), etc.) stored in the UE 100. For example, the UE 100 may execute and operate another app through a voice recognition app stored in the UE 100. It is possible to receive a user input for executing the other app and executing an operation through the voice recognition app of the UE 100. The user input may be received through, for example, a physical button, a touch pad, a voice input, or the like. According to an embodiment, the UE 100 may correspond to various terminal devices (or electronic devices) that can be connected to the Internet such as a mobile phone, a smart phone, a personal digital assistant (PDA), a notebook computer, and the like.

According to an embodiment, the UE 100 may receive a user's speech as a user input. The UE 100 may receive a user's speech and may generate a command for operating an app based on the user's speech. Accordingly, the UE 100 may operate the app by using the command. The UE 100 may partially or fully perform an app execution operation according to the command for operating the app in a lock screen state.

The intelligent server 200 may receive a user voice input from the UE 100 through a communication network and may change the received user voice input into text data. In another embodiment, the intelligent server 200 may generate (or select) a path rule based on the text data. The path rule may include information about an action (or operation) for performing a function of an app and information about a parameter required for executing (or performing) the operation. The path rule may include the sequences of the operation of the app. The UE 100 may receive the path rule, may select an application according to the path rule, and may execute an operation included in the path rule in the selected application. When the application according to the path rule is executed, the UE 100 may partially or fully perform the operation according to a lock screen state (e.g., a lock state, an unlock state, a silent lock state that can be unlocked by simple input (e.g., touch gesture), or the like), and thereby may output at least a portion of a corresponding execution screen to the lock screen or the unlock screen.

For example, the UE 100 may execute the above operation, and may output a sound corresponding to the state of the UE 100 that executes the operation or display a screen corresponding to the state of the UE 100 that executes the operation on the display. For another example, the UE 100 may execute the above operation and may output a sound without displaying the result obtained by performing the operation on the display. For example, the UE 100 may execute, for example, a plurality of operations and may display only some results of the plurality of operations on the display. For example, the UE 100 may display only the result obtained by performing the operation of the last sequence on the display. For example, the UE 100 may execute a plurality of operations, and may output a sound corresponding to some results of the plurality of operations or output a sound corresponding to a result obtained by performing the operation of the last sequence. For another example, the UE 100 may receive a user input and display the result obtained by performing the operation on a display, or may receive a user input and output a sound corresponding to the result obtained by performing the operation.

The personalization information server 300 may include a database in which user information is stored. For example, the personalization information server 300 may receive user information (e.g., context information, app execution, etc.) from the UE 100 and may store the received user information in the database. The intelligent server 200 may be used when it receives the user information from the personalization information server 300 through a communication network and generates a path rule for a user input. According to an embodiment, the UE 100 may receive the user information from the personalization information server 300 through the communication network and may use the received user information as information for managing the database.

The suggestion server 350 may include a database in which information about the introduction of a function or an application or information to be provided are stored in a terminal. For example, the suggestion server 350 may include a database of functions that a user can use by receiving user information of the UE 100 from the personalization information server 300. The UE 100 may receive information on the function to be provided from the suggestion server 350 through the communication network and may provide the received information to a user.

That is, according to an embodiment, the integrated intelligent system 10 may receive a user's speech as a user input through the UE 100, the intelligent server 200 may generate a path rule based on the user input, and the UE 100 may operate an app according to the path rule. According to another embodiment, the UE 100 may include some or all of the functions of the intelligent server 200, the personalization information server 300, and the suggestion server 350. For example, the UE 100 may generate a path rule based on a user input to operate an app. According to another embodiment, the intelligent server 200, the personalization information server 300, and the suggestion server 350 may be configured in one or more external devices.

Figure 2A:
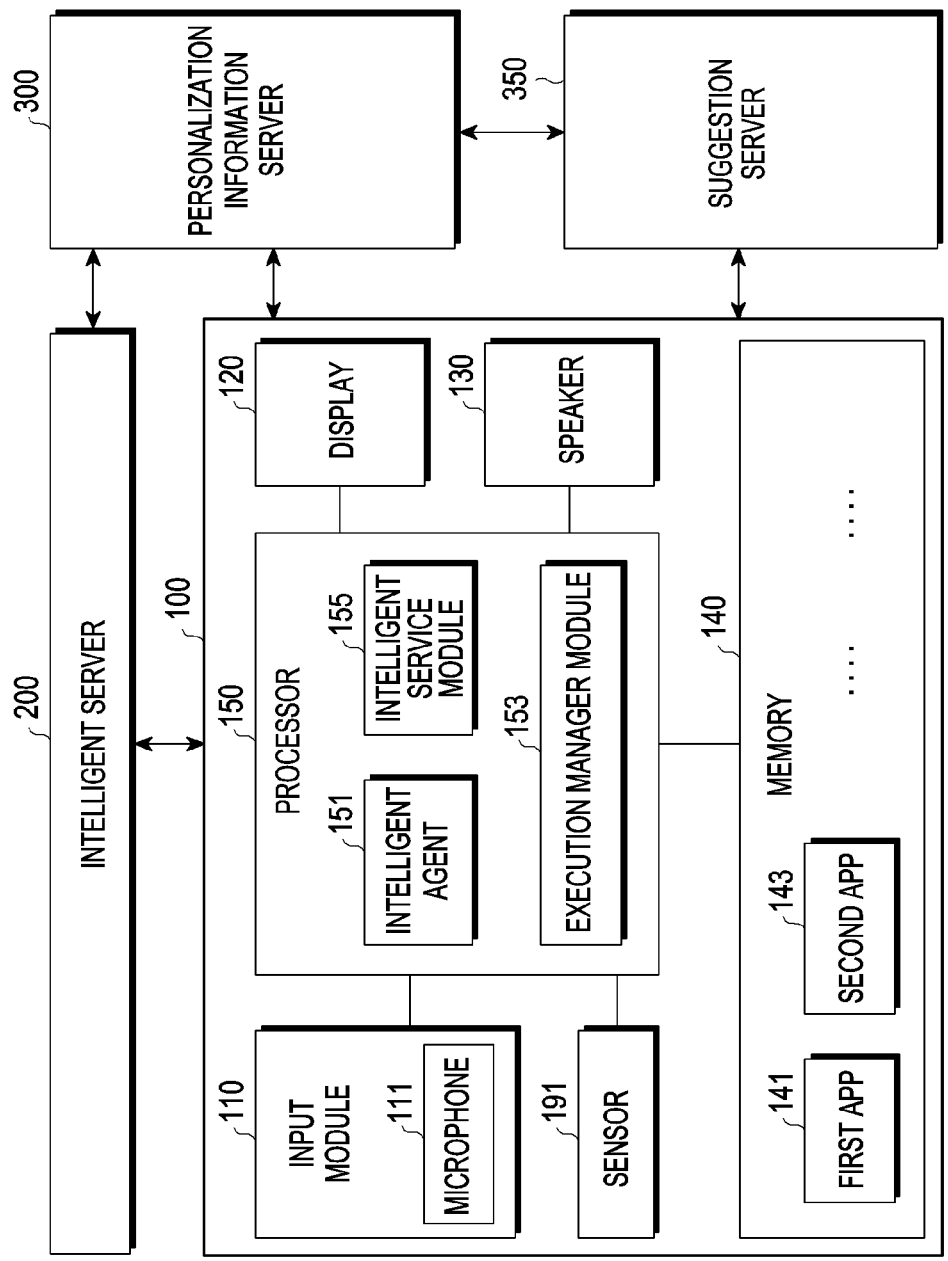
FIG. 2A is a diagram illustrating an example of a user terminal of an integrated intelligence system according to an embodiment.

FIG. 2A is a diagram illustrating an example of a user terminal of an integrated intelligence system according to an embodiment.

Referring to FIG. 2A, the UE 100 may include an input module 110, a display 120, a speaker 130, a memory 140, a sensor 191, and/or a processor 150. The UE 100 may further include a housing, and the components of the UE 100 may be seated inside the housing or located on the housing.

The input module 110 according to an embodiment may receive a user input from a user. For example, the input module (e.g., input unit) 110 may receive a user input from a connected external device (e.g., a keyboard or a headset). For another example, the input module 110 may include a touch screen (e.g., a touch screen display) coupled to the display 120. By way of another example, the input module 110 may include a hardware button or key (or a physical button or key) positioned in the UE 100 (or the housing of the UE 100).

According to an embodiment, the input module 110 may include a microphone 111 capable of receiving a user's speech as a voice signal. For example, the input module 110 may include a speech input system, and may receive a user's speech as a voice signal through the speech input system. The microphone 111 may be exposed through one side of the housing.

According to an embodiment, the display 120 may display an execution screen of an image, a video, and/or an application. For example, the display 120 may display a graphic user interface (GUI) of the app. According to an embodiment, the display 120 may be a touch screen display combined with a touch screen. According to an embodiment, the display 120 may include a light emitting device (LED), and may display whether an application is executed or progressed through the LED.

According to an embodiment, the speaker 130 may output a voice signal. For example, the speaker 130 may output a voice signal generated in the UE 100 to the outside.

According to an embodiment, the memory 140 may store software and related data. For example, the memory 140 may store a plurality of apps 141 and 143. The plurality of apps 141 and 143 stored in the memory 140 may be selected, executed, and operated according to a user input. For example, as to the plurality of apps 141 and 143 stored in the memory 140, a specific app may be selected, executed, and operated according to a duration of a user input. For example, the memory 140 may include a non-volatile memory (e.g., a flash memory, a hard disk, etc.) and/or a volatile memory (e.g., a random access memory (RAM)), and the plurality of apps 141 and 143 may be stored in the non-volatile memory and loaded and operated in the volatile memory. The memory 140 may be located in the housing, may be electrically connected to the processor 150, and may include a user interactive application (e.g., an application in which at least a part of a function is performed by a user input) having a first user interface. The memory 140 may store at least one instruction related to the execution of an operation of the processor 150. According to an embodiment, the memory 140 may include a database capable of storing information required for recognizing (or identifying) a user input. For example, the memory 140 may include a log database capable of storing log information. For another example, the memory 140 may include a persona database that may store user information.

The processor 150 may control the overall operation of the UE 100. For example, the processor 150 may receive a user input through the input module 110 and may identify the received user input. The processor 150 may control the display 120 to display an image. The processor 150 may control the speaker 130 to output a voice signal. The processor 150 may call or store necessary information by controlling the memory 140. The processor 150 may be located in the housing and may be electrically connected to the communication circuit (or a wireless communication circuit), input button, microphone, and display of the UE 100.

According to an embodiment, the processor 150 may include an intelligent agent 151, an execution manager module 153, and an intelligent service module 155. In an embodiment, the processor 150 may execute the instructions stored in the memory 140 to drive the intelligent agent 151, the execution manager module 153, and the intelligent service module 155. Various modules mentioned in various embodiments of the disclosure may be implemented in hardware or in software. In various embodiments of the disclosure, operations performed by the intelligent agent 151, the execution manager module 153, and the intelligent service module 155 may be understood as operations performed by the processor 150.

The intelligent agent 151 may generate a command for operating an app based on the voice signal received by the user input. The execution manager module 153 may receive the generated command from the intelligent agent 151 and may select, execute, and operate at least one app stored in the memory 140. The intelligent service module 155 may manage user information to use the user information to process a user input.

According to an embodiment, the processor 150 may operate according to an instruction stored in the memory 140. For example, the processor 150 may control the UE 100 by executing an instruction stored in the memory 140.

The sensor 191 may include at least one biometrics sensor (e.g., a fingerprint recognition sensor, an iris recognition sensor, or a vein sensor), may include a pressure sensor, and may further include an RGB camera sensor or a location information collection sensor. According to an embodiment, as some sensor examples of the at least one sensor, a fingerprint recognition sensor and/or a pressure sensor may be included in the input module (or input unit) 110 of the UE 100. According to an embodiment, the input module 110 may include a home button, a side button of the UE 100 (e.g., a physical button, a key, or an input unit disposed in connection with executing an intelligent agent function), and/or at least a predetermined region (e.g., an icon region) of the display 120. The fingerprint recognition sensor and/or the pressure sensor may be included in the at least predetermined region of the home button, side button, or display 120. A fingerprint recognition function may be performed when a user presses the home button, presses the side button assigned in connection with the execution of an intelligent agent function or a voice command function (or a user interaction application), or touches the predetermined region of the display 120. According to an embodiment, the iris recognition sensor may include a light emitting unit for outputting light of a designated wavelength band and a light receiving unit for receiving light of a designated wavelength band and recognizing an iris. According to an embodiment, the RGB camera sensor may acquire an image related to a designated subject by using visible light. For example, the RGB camera sensor may be activated while a user presses a designated input button (e.g., the home button or the side button) to acquire and transmit an image of a user's face to the processor 150.

The above-described UE 100 may perform user authentication based on biometric sensing information acquired through at least one sensor (e.g., fingerprint recognition sensor) when an input occurs by the input unit (e.g., a partial region of the input module 110 or the display 120) in a lock state (e.g., a lock state, a state in which a lock screen is output, etc.), may identify whether a duration of the input exceeds a first threshold time (e.g., 1200 ms), may perform a first function when the duration is less than or equal to the first threshold time in response to a success of the user authentication (or unlock based on the success of the user authentication), and may perform a second function when the duration exceeds the first threshold time in response to the success of the user authentication (or unlock based on the success of the user authentication). For example, the first function may be a function of displaying an application screen that was being executed before the user authentication succeeds (e.g., before a lock state), and the second function may be a function of executing the intelligent agent 151.

According to various embodiments, the UE 100 may perform at least one of a function of recognizing a user voice input when the intelligent agent 151 is executed and executing at least one application of the UE 100 based on the voice-recognized contents, a function of executing at least one action (e.g., a unit for executing the function of the UE 100 in response to each of the voice-recognized contents), or a function of outputting a result (e.g., an answer) corresponding to the voice-recognized contents.

According to various embodiments, the function of executing the action may include at least one of a first action for detecting a picture taken in Hawaii among pictures stored in a gallery based on location information stored in the picture, when a voice input of "send a picture taken in Hawaii to mother" is collected from a user; a second action for detecting address information related to mother from phonebook information; a third action for executing a message application; a fourth action for inputting mother in a receiving address field of the message application and designating a file attachment of the message application as the picture taken in Hawaii; or a fifth action for transmitting the corresponding message. The UE 100 may output a user interface (e.g., a screen for executing the corresponding action) corresponding to the at least one action on the display 120 while the above-mentioned action is performed.

The UE 100 according to various embodiments may be configured to perform the above-described plurality of actions according to the user voice input when the intelligent agent 151 is executed.

Figure 2B:
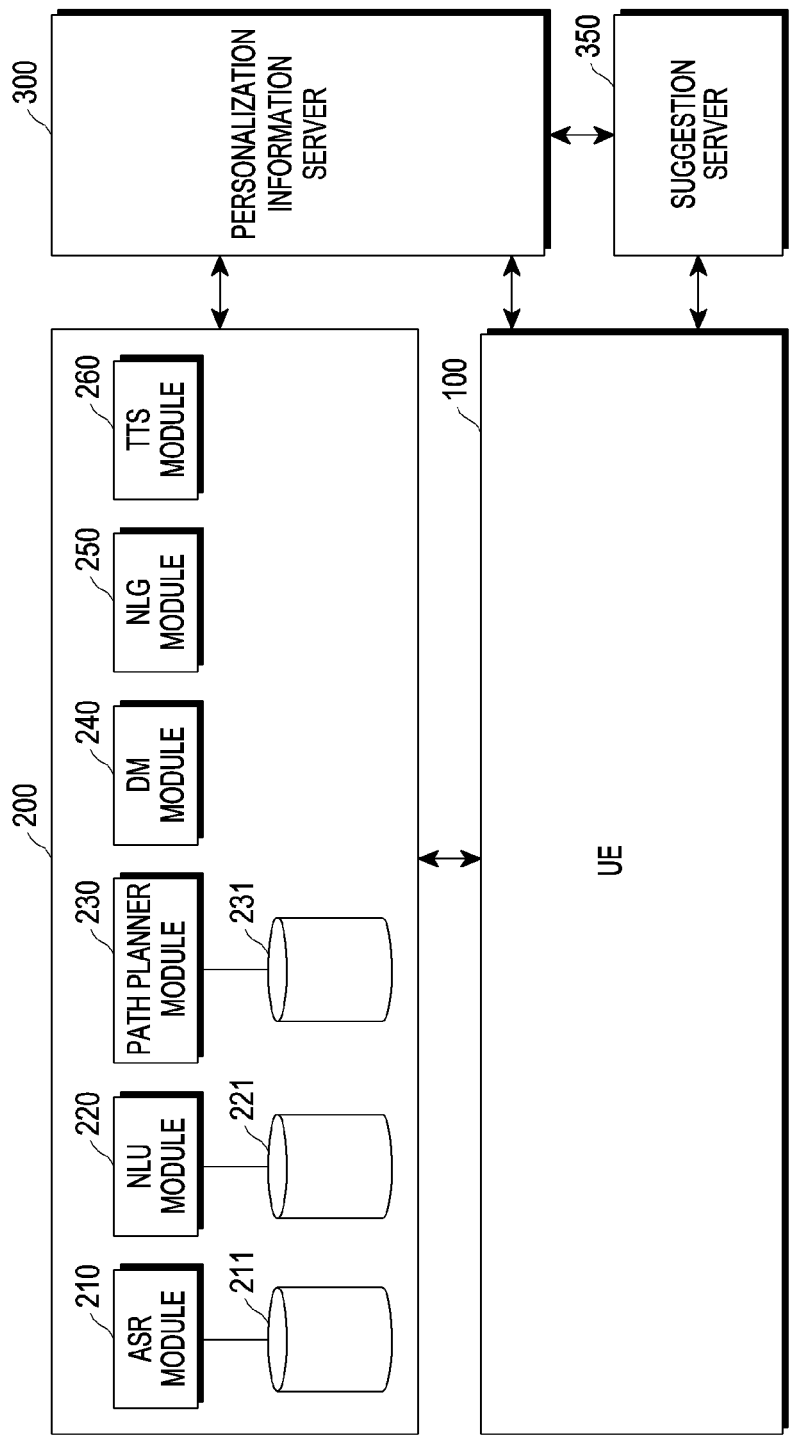
FIG. 2B is a diagram illustrating an example of an intelligent server of an integrated intelligence system according to an embodiment.

FIG. 2B is a diagram illustrating an example of an intelligent server of an integrated intelligence system according to an embodiment. Referring to FIG. 2B, the intelligent server 200 may include an automatic speech recognition (ASR) module 210, a natural language understanding (NLU) module 220, a path planner module 230, a dialogue manager (DM) module 240, a natural language generator (NLG) module 250, and a text to speech (TTS) module 260.

The ASR module 210, the NLU module 220, and/or the path planner module 230 of the intelligent server 200 may generate a path rule. According to an embodiment, the ASR module 210 may convert a user input received from the UE 100 into text data.

According to an embodiment, the ASR module 210 may include a speech recognition module. The speech recognition module may include an acoustic model and a language model. For example, the acoustic model may include information related to speech, and the language model may include information about unit phoneme information and a combination of the unit phoneme information. In addition, the language model may select or weight a portion of the unit phoneme information based on surrounding conditions (e.g., location, peripheral device information, etc.), usage conditions (e.g., an app state, a previous query history, etc.), and the like. The speech recognition module may convert a user's speech into text data using speech-related information and the unit phoneme information. Information about the acoustic model and the language model may be stored in, for example, an automatic speech recognition database 211.

According to an embodiment, the intelligent server 200 may further include a speaker recognition module. The speaker recognition module may recognize a speaker by analyzing a user's speech based on user information stored in the database. The speaker recognition module may generate a speaker recognition model based on a speech initially input by a user and may store the generated speaker recognition model in the database. According to an embodiment, the speaker recognition module may determine whether the corresponding speaker is a speaker registered in the model based on the speaker recognition model. For example, when the speaker is determined to be the registered speaker, the speaker recognition module may perform all functions corresponding to the user input. In another example, if it is determined that the speaker is not registered, only a limited function of the user input may be performed. According to an embodiment, the speaker recognition module may be utilized as a wakeup recognition method for activating speech recognition. For example, whether the corresponding voice is a voice of the registered speaker may be determined and voice recognition or natural language processing may be performed on the registered speaker voice.

According to an embodiment, the NLU module 220 may determine user's intent by performing syntactic analysis and semantic analysis. The syntactic analysis may divide a user input into syntactic units (e.g., words, phrases, morphemes, etc.) and may determine what syntactic elements the divided units have. The semantic analysis may be performed using semantic matching, rule matching, or formula matching. Accordingly, the NLU module 220 may obtain a domain for a user input, intent, and/or a parameter (or a slot) necessary for expressing the intent.

For example, the NLU module 220 may determine user's intent by matching a domain, intent, and/or a parameter to each case using a matching rule included in a rule-based algorithm. According to an embodiment, the path planner module 230 may generate a path rule by using the user's intent determined from the NLU module 220. The path planner module 230 will be described in detail later.

According to an embodiment, the DM module 240 may determine whether the user's intent determined by the NLU module 220 is clear. For example, the DM module 240 may determine whether the user's intent is clear based on whether information of the parameter is sufficient. The DM module 240 may determine whether the parameter determined in the NLU module 220 is sufficient to perform a task. According to an embodiment, if the user's intent is not clear, the DM module 240 may perform feedback for requesting necessary information from the user. For example, the DM module 240 may perform feedback for requesting information on the parameter for determining the user's intent.

According to an embodiment, the DM module 240 may include a content provider module. The content provider module may generate a result obtained by performing a task corresponding to the user input when the content provider module can perform an operation based on the intent and the parameter determined by the NLU module 220. According to an embodiment, the DM module 240 may transmit the result generated by the content provider module to the UE 100 in response to the user input.

According to an embodiment, the NLG module 250 may change designated information into a text form. The text form may be a form of natural language speech. The designated information may be, for example, information for an additional input, information for guiding completion of an operation, or the like. The information changed in the text form may be transmitted to the UE 100 and displayed on the display 120, or may be transmitted to the TTS module 260 and changed in the form of voice.

According to an embodiment, the TTS module 260 may change information in a text form into information in a speech form. The TTS module 260 may receive the information in the text form from the NLG module 250, may change the information in the text form into the information in the speech form, and may transmit the changed information to the UE 100. The UE 100 may output the information in the speech form through the speaker 130.

Figure 3:
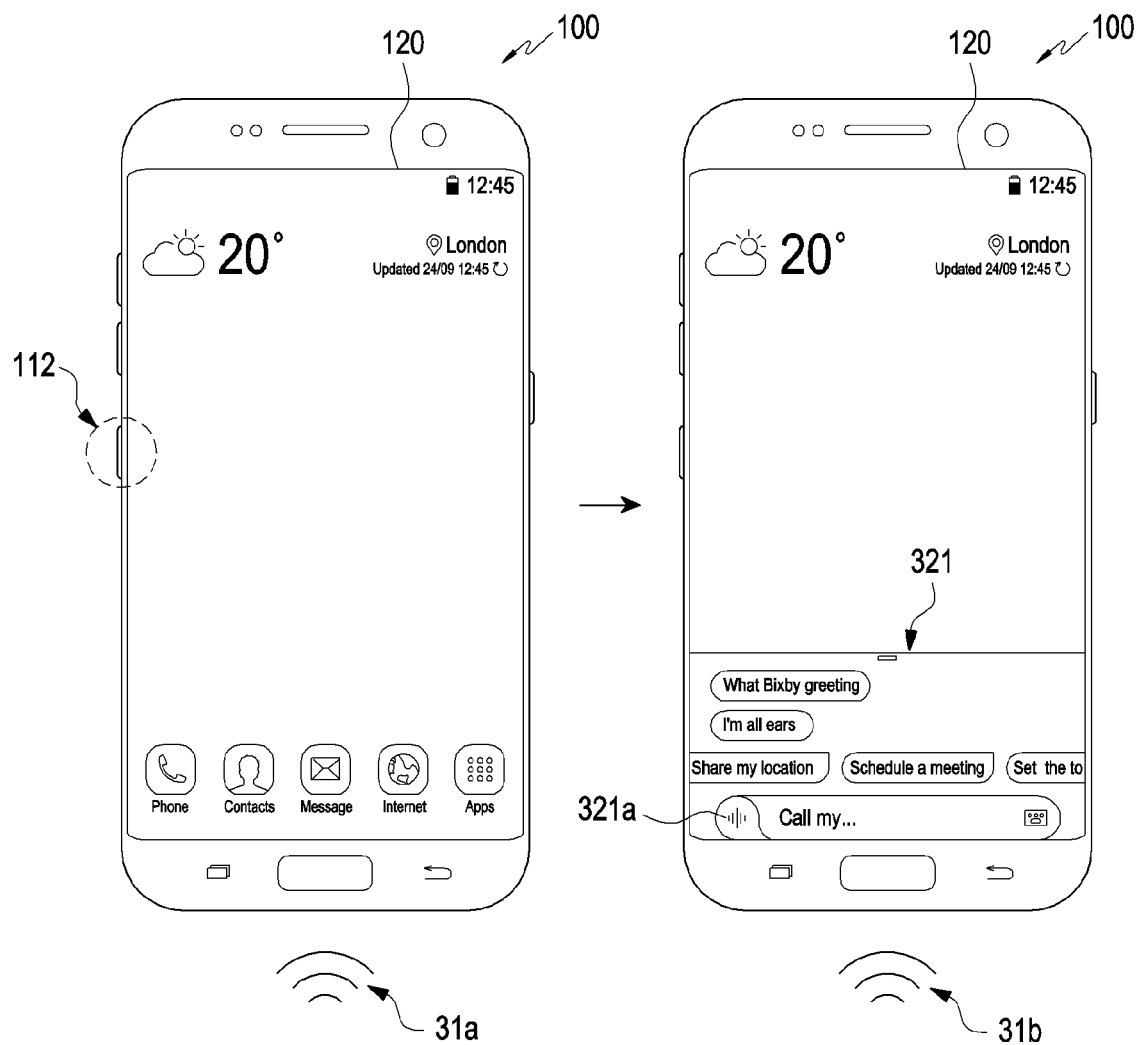
FIG. 3 is a diagram illustrating a case of executing an intelligent function of a user terminal according to an embodiment.

FIG. 3 is a diagram illustrating a case of executing an intelligent function of a user terminal according to an embodiment.

Referring to FIG. 3, the UE 100 may receive a user input and may execute an intelligent function (e.g., an intelligent application or a voice recognition application) linked with the intelligent agent 151. According to an embodiment, the UE 100 may perform a user authentication function or an intelligent agent function based on an input to the input unit 112 (e.g., a hardware key). For example, the input unit 112 may include at least one biometrics sensor and pressure sensor, and may provide at least one piece of biometric sensing information on the input and pressure information on the input. For example, the at least one biometrics sensor and the pressure sensor may share an input region (or a region to a key, a button, or an icon) of the input unit, and may sense, when an input in which a user's finger is touched or pressed is generated, biometric information (e.g., fingerprint) while sensing a touch and/or pressure on the generated input. According to various embodiments, when receiving a user input through the input unit 112, the UE 100 may perform user authentication based on biometric sensing information obtained through at least one sensor with respect to the corresponding input. Next, the UE 100 may identify whether a duration of the input exceeds a first threshold time (e.g., 1200 ms), may perform a first function when the duration is less than or equal to the first threshold time in response to a success of the user authentication (or unlock based on success of user authentication), and may perform a second function when the duration exceeds the first threshold time in response to the success of the user authentication (or unlock based on success of user authentication). For example, the second function may be a function of executing the intelligent agent or a function of displaying a UI (e.g., an intelligent agent execution screen) of an intelligent app associated with the intelligent agent. The UE 100 may display a user interface (UI) 321 of the intelligent app on the display 120. For example, the UE 100 may receive a voice input as shown in 31*b* while the UI 321 of the intelligent app is displayed on the display 120. The user may touch a voice recognition button 321*a* in the UI 321 of the intelligent app to receive a voice.

According to an embodiment, the UE 100 may execute an intelligent app for recognizing a voice through the microphone 111. For example, when a designated voice (e.g., Bixby!, wake up!, or wake up!) is input as shown in 31*a* through the microphone 111, the UE 100 may display the UI 321 of the intelligent app on the display 120.

Figure 4:
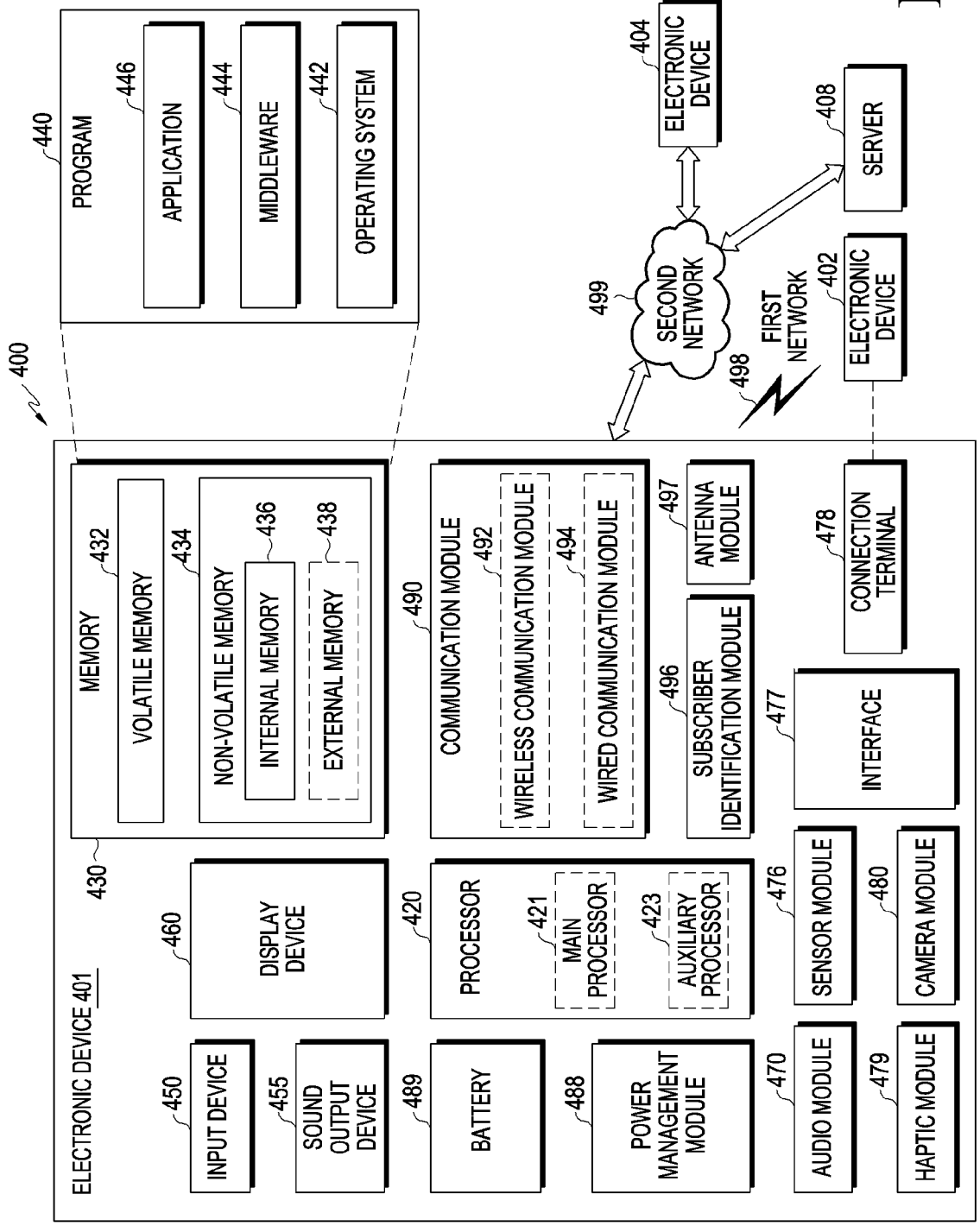
FIG. 4 is a block diagram illustrating an electronic device in a network environment according to various embodiments.

FIG. 4 is a block diagram illustrating an electronic device 401 in a network environment 400 according to various embodiments.

Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as BLUETOOTH, wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., PCB). According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 108 coupled with the second network 499. Each of the electronic devices 402 and 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with" or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., program 440) including one or more instructions that are stored in a storage medium (e.g., internal memory 436 or external memory 438) that is readable by a machine (e.g., electronic device 401). For example, a processor (e.g., processor 420) of the machine (e.g., electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 5:
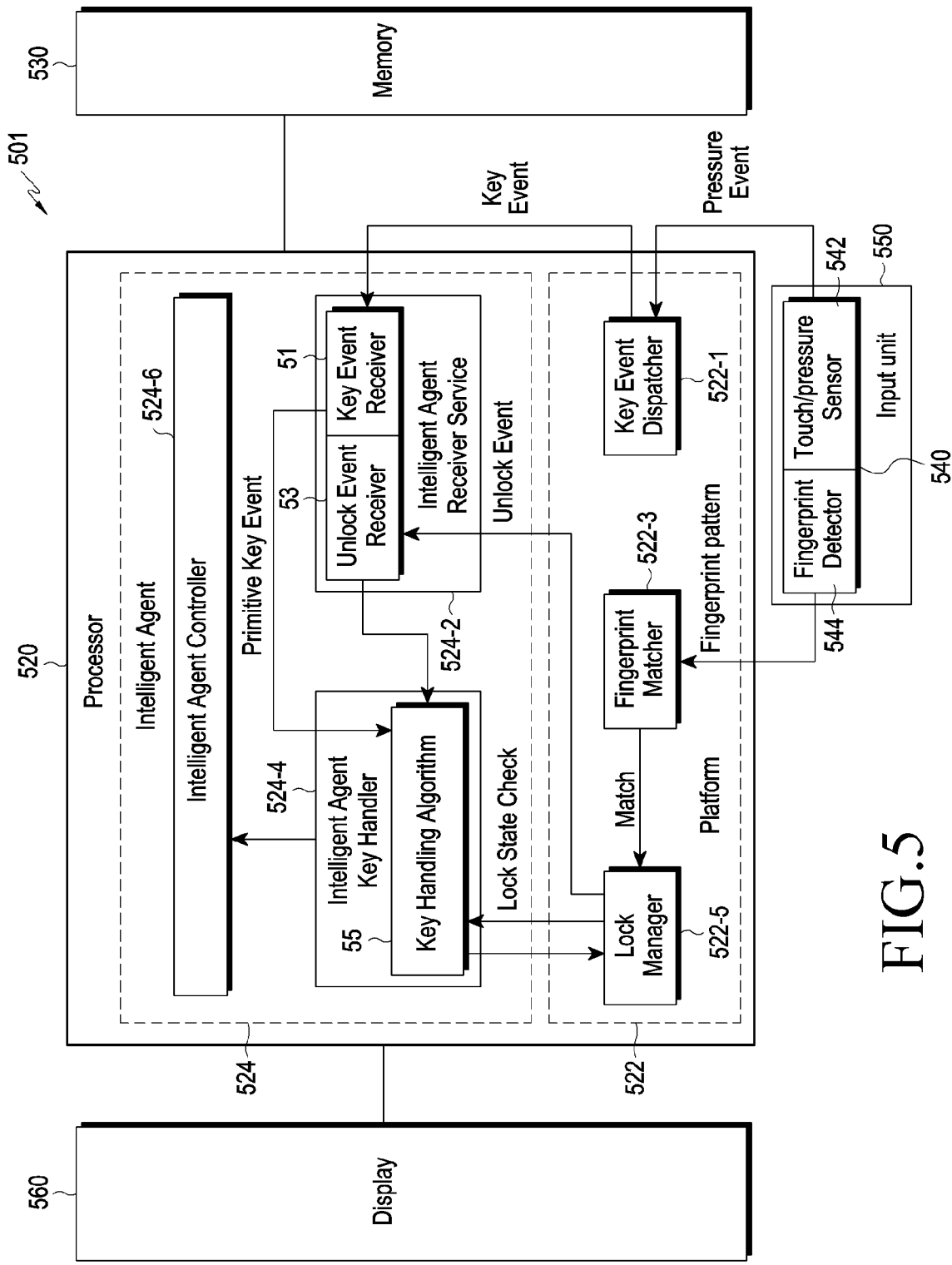
FIG. 5 is a configuration diagram illustrating an electronic device according to various embodiments.

FIG. 5 is a configuration diagram illustrating an electronic device 501 according to various embodiments.

Referring to FIG. 5, the electronic device 501 (e.g., the UE 100 of FIG. 1, 2A, 2B, or 3, or the electronic device 401 of FIG. 4) according to various embodiments may include a processor 520 (e.g., the processor 150 of FIG. 2A or the processor 420 of FIG. 4), a memory 530 (e.g., the memory 140 of FIG. 2A or the memory 430 of FIG. 4), at least one sensor 540 (e.g., the sensor 191 of FIG. 2A or the sensor module 476 of FIG. 4), an input unit 550 (e.g., the input module 110 of FIG. 2A, the hardware key of FIG. 3, or the input device 450 of FIG. 4), and/or a display 560 (e.g., the display 120 of FIG. 2A, the display 120 of FIG. 3, or the display device 460 of FIG. 4).

The processor 520 according to various embodiments may drive software (operating system or program) stored in the memory 530 to control at least one other component (e.g., hardware or software components) of the electronic device 501 connected to the processor 520, and may perform various data processing and operations. The processor 520 may load a command or data received from another component (e.g., the communication module 490 of FIG. 4) into the memory 530 (e.g., the volatile memory 432 of FIG. 4) and may process the loaded information, and may store the result data in the memory 530 (e.g., the nonvolatile memory 434 of FIG. 4).

The memory 530 may store software (e.g., the program 440 of FIG. 4) for various data processing and operations in the electronic device 501 and the related data.

According to various embodiments, the memory 530 may store instructions that cause, when executed, the processor 520 to perform user authentication based on biometric sensing information obtained through the at least one sensor 540 in response to an input to the input unit 550; to identify whether a duration of the input exceeds a first threshold time (e.g., 1200 ms); to perform a first function when the duration is less than or equal to the first threshold time in response to a success of the user authentication (or unlock based on the success of the user authentication); and to perform a second function when the duration exceeds the first threshold time in response to the success of the user authentication (or unlock based on the success of the user authentication). For example, the first function may be a function of displaying an application screen that was being executed before the user authentication succeeds (e.g., before a lock state), and the second function may be a function of executing an intelligent agent.

According to various embodiments, the instructions may cause the processor to display a lock screen when the duration is less than or equal to the first threshold time in response to a failure of the user authentication (or lock based on the failure of the user authentication); and to display an unlock request message when the duration of the input exceeds the first threshold time in response to the failure of the user authentication (or lock based on the failure of the user authentication). According to various embodiments, the processor 520 may load software stored in the memory 530 and the related data to perform the first function or the second function, display a lock screen, or display an unlock request message. According to various embodiments, the first threshold time may be a time taken until the user authentication is completed and unlocked by the input. According to various embodiments, the first threshold time may be a time reference for distinguishing whether the input is an input for performing the first function after unlocking or an input for performing the second function after unlocking. According to various embodiments, the first threshold time may be a time (e.g., 1200 ms) designated for identifying whether the input is a first input for performing the first function after the success of the user authentication or a second input for performing the second function after the success of the user authentication.

According to various embodiments, some of the at least one sensor 540 (e.g., the sensor 191 of FIG. 2 or the sensor module 476 of FIG. 4) may be included in the input unit 550. For example, some of the at least one sensor 540 may include a touch and/or pressure sensor (e.g. touch sensor, pressure sensor, or touch/pressure sensor) 542 and a fingerprint detector (or fingerprint recognition sensor) 544. In other words, the input unit 550 may include the touch and/or pressure sensor 542 and the fingerprint detector (or fingerprint recognition sensor) 544. The touch and/or pressure sensor 542 and the fingerprint detector (or fingerprint recognition sensor) 544 may simultaneously perform a sensing operation in response to the first input to the input unit 550. For example, the touch and/or pressure sensor 542 and the fingerprint detector (or fingerprint recognition sensor) 544 may share an input region (or a region corresponding to a key, a button, or an icon) of the input unit 550. When the user's finger touches or presses on the input region, the touch and/or pressure sensor 542 may sense the touch and/or pressure for the input and at the same time, the fingerprint detector (or fingerprint recognition sensor) 544 may sense the fingerprint for the input. The input unit 550 may output a touch and/or pressure sensing result and a fingerprint sensing result for the input, respectively.

According to various embodiments, the processor 520 may include a platform 522 and an intelligent agent 524. According to various embodiments, the platform 522 and the intelligent agent 524 may be included in one processor 520 or may be included in one or more processors, respectively.

According to various embodiments, the platform 522 may perform operations for basic operations of the electronic device 501, for example, operations for basic control of each component of the electronic device 501, and may include an operating system (OS). For example, the OS may be a basic operating system mounted on an electronic device by various electronic device manufacturers such as Android OS, Google OS, iOS, and the like. According to various embodiments, the platform 522 may perform user authentication based on biometric sensing information obtained through the at least one sensor 540 included in the input unit 550 in response to an input to the input unit 550, and may manage (or configure) the state of the electronic device 501 as a lock state or an unlock state based on the success or failure of the user authentication.

According to an embodiment, the platform 522 may include a key event dispatcher 522-1, a fingerprint matcher 522-3, and a lock manager 522-5. The key event dispatcher 522-1, the fingerprint matcher 522-3, or the lock manager 522-5 may each be a software module. According to another embodiment, the key event dispatcher 522-1, the fingerprint matcher 522-3, or the lock manager 522-5 may be configured as one software module capable of performing all the functions of each module.

The key event dispatcher 522-1 may receive touch and/or pressure information (touch/pressure event) from the touch/or pressure sensor 542 included in the input unit 550, and may identify an input to the input unit 550. For example, the key event dispatcher 522-1 may identify which input means (e.g., a key, a button, or an icon at a specific location) is input by which input method (e.g., touch, short press, or long press). The fingerprint matcher 522-3 may receive fingerprint recognition sensing information (fingerprint pattern) from the fingerprint detector (or fingerprint recognition sensor) 544 included in the input unit 550, and may perform user authentication by matching the received fingerprint recognition sensing information and stored user fingerprint information. The lock manager 522-5 may manage (or configure) the state of the electronic device 501 as a lock state or an unlock state based on the success (match) of the user authentication or the failure (unmatch) of the user authentication.

According to various embodiments, the intelligent agent 524 may identify whether the duration of the input exceeds a first threshold time (e.g., 1200 ms) in response to the input to the input unit 550. The intelligent agent 524 may display an application screen which was being executed before the success of the user authentication (e.g., lock state) on the display 560 when the duration of the input is less than or equal to the first threshold time in response to the success of the user authentication (or unlock based on the success of the user authentication). The intelligent agent 524 may execute an intelligent application when the duration of the input exceeds the first threshold time in response to the success of the user authentication (or unlock based on the success of the user authentication), and may display an intelligent application screen on the display 560.

According to an embodiment, the intelligent agent 524 may include an intelligent agent receiver service 524-2, an intelligent agent key handler 524-4, and an intelligent agent controller 524-6. The intelligent agent receiver service 524-2, the intelligent agent key handler 524-4, and the intelligent agent controller 524-6 may each be a software module, and according to another embodiment, they may be configured as one software module capable of performing all the functions of each module.

The intelligent agent receiver service 524-2 may include a key event receiver 51 and an unlock event receiver 53. The key event receiver 51 may receive identified input information (which input means (e.g., a key, a button, or an icon at a specific location) is input by which input method (e.g., touch, short press, or long press)) (primitive key event) in response to an input to the input unit 550 from the key event dispatcher 522-1. The unlock event receiver 53 may receive an unlock event from the lock manager 522-5 when the electronic device 501 enters an unlock state based on the success of user authentication.

The intelligent agent key handler 524-4 may include a key handling algorithm 55. The intelligent agent key handler 524-4 may use the key handling algorithm 55 to determine whether the electronic device 501 is in a lock state or an unlock state, may determine the success of the user authentication (or unlock based on the success of the user authentication), and may determine the duration of the input to the input unit 550. For example, the intelligent agent key handler 524-4 may determine the lock state or the unlock state of the electronic device 501 from the lock manager 522-5, may receive an unlock event from the unlock event receiver 53 when the electronic device 501 enters the unlock state based on the success of the user authentication, and may receive the identified input information in response to the input to the input unit 550 from the unlock event receiver 53 to thereby determine the duration of the input to the input unit 550. The intelligent agent key handler 524-4 may provide input type information according to the lock state or the unlock state of the electronic device 501, whether the user authentication is successful, or the duration of the input. For example, when the user authentication succeeds (or unlock based on the success of the user authentication) in the lock state and the duration of the input is less than or equal to the first threshold time, the intelligent agent key handler 524-4 may provide information indicating that the corresponding input is a first type input. When the user authentication succeeds (or unlock based on the success of the user authentication) in the lock state and the duration of the input exceeds the first threshold time, the intelligent agent key handler 524-4 may provide information indicating that the corresponding input is a second type input. When the user authentication fails in the lock state and the duration of the input is less than or equal to the first threshold time, the intelligent agent key handler 524-4 may provide information indicating that the corresponding input is a third type input. When the user authentication fails in the lock state and the duration of the input exceeds the first threshold time, the intelligent agent key handler 524-4 may provide information indicating that the corresponding input is a fourth type input.

The intelligent agent controller 524-6 may receive the input type information from the intelligent agent key handler 524-4 and may perform a function corresponding to the input type information. For example, in a case in which the information indicating that the corresponding input is the first type input is received when the user authentication succeeds (or unlock based on the success of the user authentication) in the lock state and the duration of the input is less than or equal to the first threshold time, the intelligent agent controller 524-6 may control a first function to be performed. In a case in which the information indicating that the corresponding input is the second type input is received when the user authentication succeeds (or unlock based on the success of the user authentication) in the lock state and the duration of the input exceeds the first threshold time, the intelligent agent controller 524-6 may control a second function to be performed. For example, the first function may be a function of displaying an application screen that was being executed before the user authentication succeeds (e.g., before a lock state), and the second function may be a function of executing the intelligent agent. In a case in which the information indicating that the corresponding input is the third type input is received when the user authentication fails in the lock state and the duration of the input is less than or equal to the first threshold time, the intelligent agent controller 524-6 may ignore the input or control the lock screen to be displayed. In a case in which the information indicating that the corresponding input is the fourth type input is received when the user authentication fails in the lock state and the duration of the input exceeds the first threshold time, the intelligent agent controller 524-6 may control an unlock request message to be displayed.

According to various embodiments, an electronic device (e.g., the UE 100 of FIG. 1, 2A, 2B, or 3, the electronic device 401 of FIG. 4, or the electronic device 501 of FIG. 5) may include: a display (e.g., the display 120 of FIG. 2A or 3, the display device 460 of FIG. 4, or the display 560 of FIG. 5); an input unit (e.g., the input module 110 of FIG. 2A or 3, the input device 450 of FIG. 4, or the input unit 550 of FIG. 5) configured to include at least one biometrics sensor (e.g., the sensor module 476 of FIG. 4 or the at least one sensor 540 of FIG. 5); at least one processor (e.g., the processor 150 of FIG. 2A, the processor 420 of FIG. 4, or the processor 520 of FIG. 5) configured to be operatively connected to the display and the input unit; and/or a memory (e.g., the memory 140 of FIG. 2A, the memory 430 of FIG. 4, or the memory 530 of FIG. 5) configured to be operatively connected to the at least one processor. Here, the memory may store instructions that cause, when executed, the at least one processor to perform user authentication based on biometric sensing information obtained through the at least one biometrics sensor in response to an input to the input unit in a lock state; and in response to the success of the user authentication, perform a first function when a duration of the input is less than or equal to a first threshold time, and perform a second function when the duration of the input exceeds the first threshold time.

According to various embodiments, the first function may include a function of displaying an application screen that was being executed before the lock state, and the second function may include a function of executing an intelligent agent.

According to various embodiments, the instructions may be configured to cause the at least one processor: to receive a first intelligent agent screen or voice for providing information related to the intelligent agent to the display as the intelligent agent is executed; and to display one of second intelligent agent screens for having a conversation with the intelligent agent.

According to various embodiments, the instructions may be configured to cause the at least one processor: to in response to a failure of the user authentication, display a lock state screen or to ignore the input when the duration is less than or equal to the first threshold time, and to display an unlock request message on the display when the duration exceeds the first threshold time.

According to various embodiments, the input unit may include at least one of a key, a button, or a predetermined region included in the display.

According to various embodiments, the at least one biometrics sensor may include a fingerprint recognition sensor, and the instructions may be configured to cause the at least one processor to perform the user authentication using fingerprint recognition sensing information of the fingerprint recognition sensor.

According to various embodiments, the electronic device may further include a foldable display, and the instructions may be configured to cause the at least one processor to determine a folded state or an unfolded state of the foldable display.

According to various embodiments, the instructions may be configured to cause the at least one processor: to determine whether the foldable display is changed to the unfolded state within a designated time after the input while the second intelligent agent screen is displayed on the display in response to the input in the folded state of the foldable display; and to stop the displaying the second intelligent agent screen on the display when the foldable display is changed to the unfolded state within the designated time after the input and to display a screen corresponding to the unfolded state on the foldable display.

According to various embodiments, the instructions may be configured to cause the at least one processor: to determine whether the input is an input received within the designated time after the foldable display is changed to the unfolded state when the foldable display is changed from the folded state to the unfolded state; and to ignore the input when the input is the input received within the designated time after the foldable display is changed to the unfolded state.

According to various embodiments, the first threshold time may be a time (e.g., 1200 ms) designated for determining whether the input is a first input for performing the first function after the success of the user authentication or a second input for performing the second function after the success of the user authentication.

Figure 6:
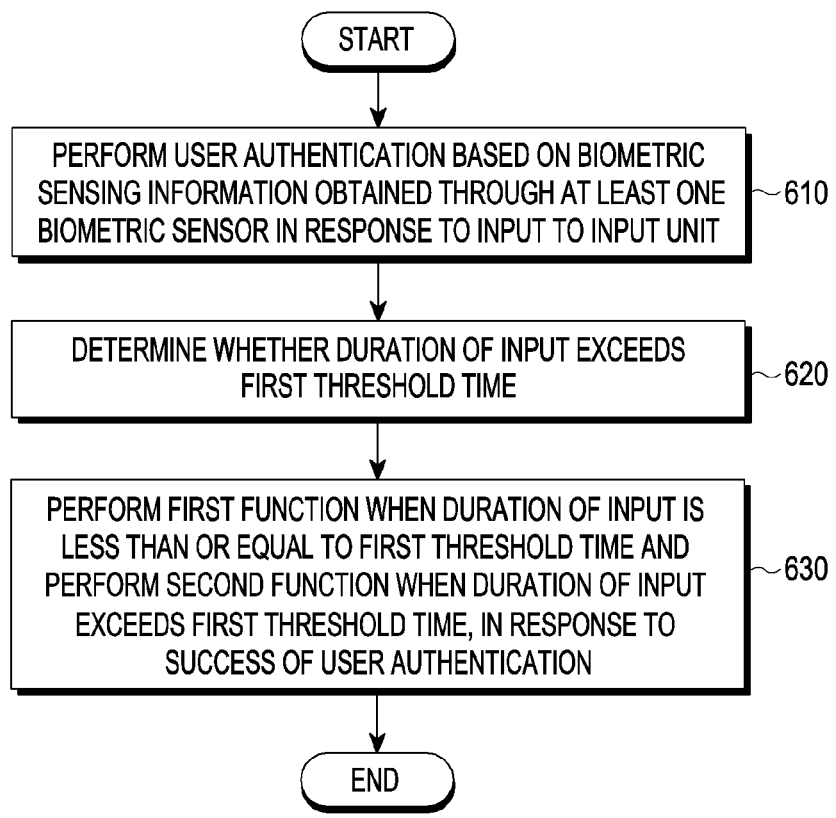
FIG. 6 is a flowchart illustrating the operation of an electronic device according to various embodiments.

FIG. 6 is a flowchart illustrating the operation of an electronic device according to various embodiments.

Referring to FIG. 6, operations 610 to 630 according to various embodiments may be understood as operations performed by a processor (e.g., the processor 150 of FIG. 2A, the processor 420 of FIG. 4, or the processor 520 of FIG. 5) of the electronic device 501 (e.g., the UE 100 of FIG. 1, 2A, 2B, or 3, the electronic device 401 of FIG. 4, or the electronic device 501 of FIG. 5). According to an embodiment, at least one of operations 610 to 630 may be omitted, some operations thereof may be reversed, or another operation may be added.

In operation 610, the processor 520 according to various embodiments may perform user authentication based on biometric sensing information obtained through the at least one sensor 540 in response to an input to the input unit 550. According to various embodiments, the input unit 550 may include the touch and/or pressure sensor 542 and the fingerprint detector (or fingerprint recognition sensor) 544 as some of the at least one sensor 540 (e.g., the sensor 191 of FIG. 2 or the sensor module 476 of FIG. 4). The touch and/or pressure sensor 542 and the fingerprint detector (or fingerprint recognition sensor) 544 may simultaneously perform a sensing operation in response to the input to the input unit 550. For example, the touch and/or pressure sensor 542 and the fingerprint detector (or fingerprint recognition sensor) 544 may share an input region (or a region corresponding to a key, a button, or an icon) of the input unit 550. When the user's finger touches or presses on the input region, the touch and/or pressure sensor 542 may sense the touch and/or pressure for the input and at the same time, the fingerprint detector (or fingerprint recognition sensor) 544 may sense the fingerprint for the input. The input unit 550 may output a touch and/or pressure sensing result and a fingerprint sensing result for the input, respectively.

In operation 620, the processor 520 according to various embodiments may determine whether a duration of the input exceeds a first threshold time (e.g., 1200 ms) in response to the input to the input unit 550. For example, the processor 520 may identify whether a time during which the input is maintained and continues starting from a time point when the input to the input unit 550 is started exceeds the first threshold time (e.g., 1200 ms). For example, when the input unit 550 includes a key, whether a time period from a key down time point to a key up time point exceeds the first threshold time (e.g., 1200 ms) may be identified. According to various embodiments, the first threshold time may be a time taken until the user authentication is completed and unlocked by the input. According to various embodiments, the first threshold time may be a time reference for distinguishing whether the input is an input for performing a first function after unlocking or an input for performing a second function after unlocking.

In operation 630, the processor 520 according to various embodiments may perform the first function when the duration of the input is less than or equal to the first threshold time in response to success of the user authentication (or unlock based on the success of the user authentication), and may perform the second function when the duration of the input exceeds the first threshold time in response to success of the user authentication (or unlock based on the success of the user authentication). For example, the first function may be a function of displaying an application screen that was being executed before the user authentication succeeds (e.g., before a lock state), and the second function may be a function of executing an intelligent agent.

According to various embodiments, the processor 520 may ignore the input and control a lock screen to be displayed when the duration is less than or equal to the first threshold time in response to a failure of the user authentication (e.g., lock based on the failure of the user authentication), and may display an unlock request message when the duration exceeds the first threshold time in response to a failure of the user authentication (e.g., lock based on the failure of the user authentication).

According to various embodiments, a method of performing a biometric authentication function and an intelligent agent function using an input unit (e.g., the input module 110 of FIG. 2A or 3, the input device 450 of FIG. 4, or the input unit 550 of FIG. 5) in an electronic device (e.g., the UE 100 of FIG. 1, 2A, 2B, or 3, the electronic device 401 of FIG. 4, or the electronic device 501 of FIG. 5) may include: performing user authentication based on biometric sensing information obtained through at least one biometrics sensor (e.g., the sensor module 476 of FIG. 4 or the at least one sensor 540 of FIG. 5) in response to an input to the input unit in a lock state; in response to success of the user authentication, performing a first function when a duration of the input is less than or equal to a first threshold time, and performing a second function when the duration of the input exceeds the first threshold time.

According to various embodiments, the first function may include a function of displaying an application screen that was being executed before the lock state, and the second function may include a function of executing an intelligent agent.

According to various embodiments, the method may further include: receiving a first intelligent agent screen or voice for providing information related to the intelligent agent to the display as the intelligent agent is executed, and displaying one of second intelligent agent screens for having a conversation with the intelligent agent.

According to various embodiments, the method may further include: in response to a failure of the user authentication, displaying a lock state screen or ignoring the input when the duration is less than or equal to the first threshold time, and displaying an unlock request message on the display when the duration exceeds the first threshold time.

According to various embodiments, the input unit may include at least one of a key disposed in the electronic device, a button disposed therein, or a predetermined region included in the display.

According to various embodiments, the performing of the user authentication may include performing the user authentication using fingerprint recognition sensing information of the fingerprint recognition sensor.

According to various embodiments, the method may further include determining a folded state or an unfolded state of a foldable display included in the electronic device.

According to various embodiments, the method may further include: determining whether the foldable display is changed to the unfolded state within a designated time after the input while displaying the second intelligent agent screen on the display in response to the input in the folded state of the foldable display; and stopping the displaying of the second intelligent agent screen on the display when the foldable display is changed to the unfolded state within the designated time after the input and displaying a screen corresponding to the unfolded state on the foldable display.

According to various embodiments, the method may further include: determining whether the input is an input received within the designated time after the foldable display is changed to the unfolded state when the foldable display is changed from the folded state to the unfolded state; and ignoring the input when the input is the input received within the designated time after the foldable display is changed to the unfolded state.

Figure 7:
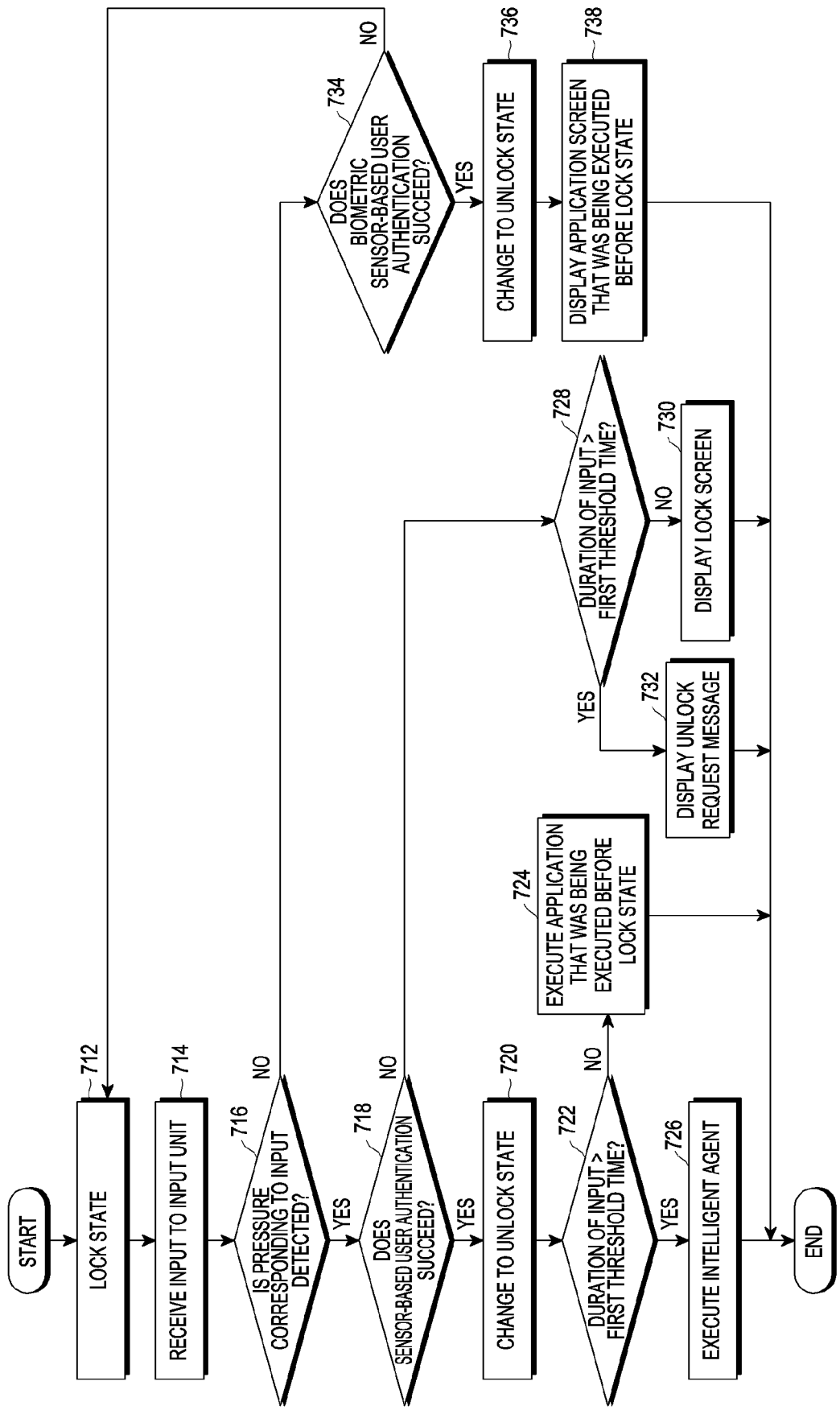
FIG. 7 is a flowchart illustrating an operation at the time of receiving an input through an input unit in a lock state in an electronic device according to various embodiments.

FIG. 7 is a flowchart illustrating an operation at the time of receiving an input through an input unit in a lock state in an electronic device according to various embodiments.

Referring to FIG. 7, operations 712 to 738 according to various embodiments may be understood as operations performed by a processor (e.g., the processor 150 of FIG. 2A, the processor 420 of FIG. 4, or the processor 520 of FIG. 5) of the electronic device 501 (e.g., the UE 100 of FIG. 1, 2A, 2B, or 3, the electronic device 401 of FIG. 4, or the electronic device 501 of FIG. 5). According to an embodiment, at least one of operations 712 to 738 may be omitted, some operations thereof may be reversed, or another operation may be added.

In operation 712, the processor 520 according to various embodiments may be in a lock state. According to various embodiments, in the lock state, a lock screen may be displayed on the display 560 in the lock state, or the display 560 may be turned off.

In operation 714, the processor 520 according to various embodiments may receive an input to the input unit 550. According to various embodiments, the input unit 550 may include the touch and/or pressure sensor 542 and the fingerprint detector (or fingerprint recognition sensor) 544 as some of the at least one sensor 540 (e.g., the sensor 191 of FIG. 2 or the sensor module 476 of FIG. 4). The touch and/or pressure sensor 542 and the fingerprint detector (or fingerprint recognition sensor) 544 may simultaneously perform a sensing operation in response to the input to the input unit 550. For example, the touch and/or pressure sensor 542 and the fingerprint detector (or fingerprint recognition sensor) 544 may share an input region (or a region corresponding to a key, a button, or an icon) of the input unit 550. When the user's finger touches or presses on the input region, the touch and/or pressure sensor 542 may sense the touch and/or pressure for the input and at the same time, the fingerprint detector (or fingerprint recognition sensor) 544 may sense the fingerprint for the input. The input unit 550 may output a touch and/or pressure sensing result and a fingerprint sensing result for the input, respectively.

In operation 716, the processor 520 according to various embodiments may determine whether a pressure on an input is detected. According to various embodiments, when an input of touching or being pressed by the user's finger occurs in an input region (a key, a button, or an icon on the display), the processor 520 may determine whether the pressure on the input is detected based on pressure information sensed with respect to an input provided by the touch and/or pressure sensor 542. For example, the processor 520 may determine that a key down (touch, short press or long press) input is received at the input unit 550 based on the pressure information.

In operation 718, the processor 520 according to various embodiments may determine whether biometric sensor-based user authentication succeeds as the pressure detection is determined. According to various embodiments, the processor 520 may determine whether the user authentication succeeds based on fingerprint recognition sensing information sensed with respect to an input provided by the fingerprint detector (or fingerprint recognition sensor) 544.

In operation 720, the processor 520 may change the lock state to the unlock state as the biometric sensor-based user authentication succeeds.

In operation 722, the processor 520 according to various embodiments may determine whether a duration of the input to the input unit 550 exceeds a first threshold time (e.g., 1200 ms) in response to the change to the unlock state. For example, the processor 520 may identify whether a time during which the input is maintained and continues starting from a time point when the input to the input unit 550 is started is less than or equal to the first threshold time (e.g., 1200 ms) or exceeds the same. For example, when the input unit 550 includes a key and the key is down by the user, whether a time period from a key down time point to a key up time point exceeds the first threshold time (e.g., 1200 ms) may be identified. According to various embodiments, the first threshold time may be a threshold time required until the user authentication is completed and unlocked by the input. According to various embodiments, the first threshold time may be a threshold time for distinguishing whether the input is an input for performing a first function after unlocking or an input for performing a second function after unlocking.

In operation 724, when the duration of the input to the input unit 550 is less than or equal to the first threshold time (e.g., 1200 ms), the processor 520 according to various embodiments may display an application screen that was being executed before the success of the user authentication (e.g., before the lock state) on the display 560.

In operation 726, when the duration of the input to the input unit 550 exceeds the first threshold time (e.g., 1200 ms), the processor 520 according to various embodiments may execute an intelligent agent. For example, the processor 520 may execute an intelligent agent application and may display a screen according to the execution of the intelligent agent application. For example, the screen displayed according to the execution of the intelligent agent application may include a first intelligent agent screen for providing intelligent agent-related information and a second intelligent agent screen for receiving a voice and talking with the intelligent agent.

In operation 728, the processor 520 according to various embodiments may determine whether the duration of the input to the input unit 550 exceeds the first threshold time (e.g., 1200 ms) while biometric sensor-based authentication does not succeed in operation 718. For example, the processor 520 may identify whether a time during which the input is maintained and continues starting from a time point when the input to the input unit 550 is started is less than or equal to the first threshold time (e.g., 1200 ms) or exceeds the same even in a state in which the input to the input unit 550 is started and biometric sensor authentication does not succeed. For example, when the input unit 550 includes a key and the key is down by the user, whether a time period from a key down time point to a key up time point exceeds the first threshold time (e.g., 1200 ms) may be identified. According to various embodiments, the first threshold time may be a threshold time required until the user authentication is completed and unlocked by the input. According to various embodiments, the first threshold time may be a threshold time for distinguishing whether to display or ignore an unlock request message in a state in which the input is not unlocked.

In operation 730, the processor 520 according to various embodiments may display a lock screen on the display 560 when a duration of the input to the input unit 550 is less than or equal to the first threshold time (e.g., 1200 ms) in a state in which the biometric sensor-based authentication does not succeed.

In operation 732, the processor 520 according to various embodiments may display the unlock request message on the display 560 when the duration of the input to the input unit 550 exceeds the first threshold time (e.g., 1200 ms) in a state in which the biometric sensor-based authentication does not succeed.

In operation 734, the processor 520 according to various embodiments may determine whether the biometric sensor-based on user authentication succeeds in response to the pressure detection which is not determined in operation 716.

In operation 736, the processor 520 according to various embodiments may change the lock state to the unlock state as the biometric sensor-based user authentication succeeds in response to the determining whether the user authentication succeeds in operation 734.

In operation 738, the processor 520 according to various embodiments may display, on the display 560, an application screen that was being executed before the success of the user authentication (e.g., before the lock state) when the user authentication succeeds in a state in which the pressure detection is not performed.

Figure 8A:
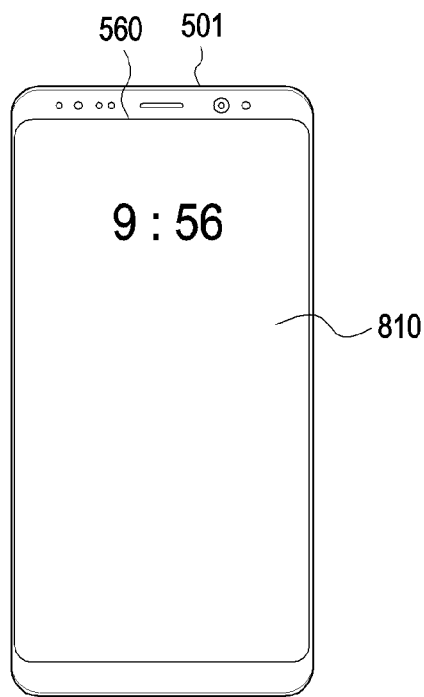
FIG. 8A is a diagram illustrating screen display examples at the time of receiving an input through an input unit in a lock state in an electronic device according to various embodiments.
Figure 8B:
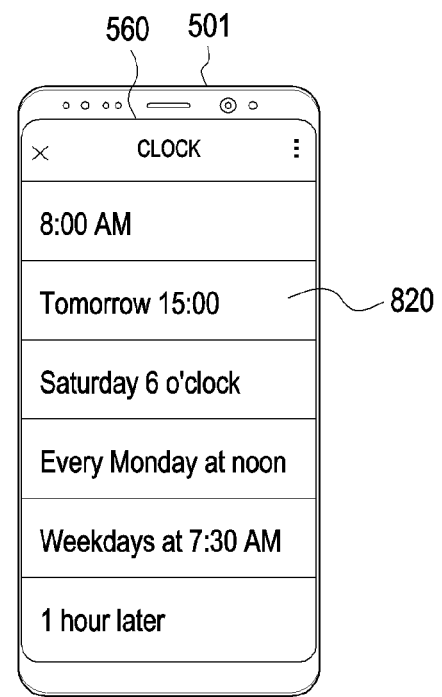
FIG. 8B is a diagram illustrating screen display examples at the time of receiving an input through an input unit in a lock state in an electronic device according to various embodiments.
Figure 8C:
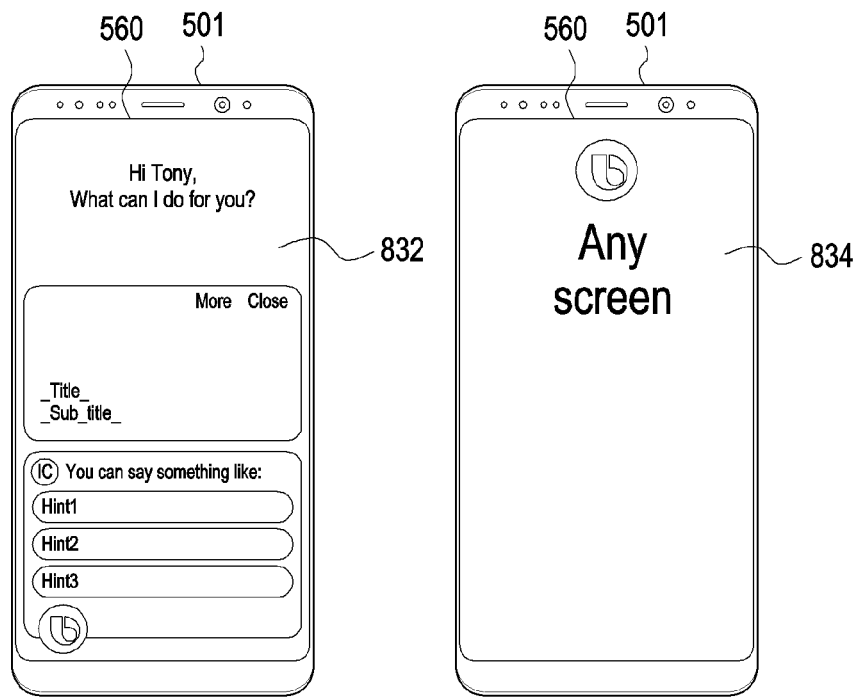
FIG. 8C is a diagram illustrating screen display examples at the time of receiving an input through an input unit in a lock state in an electronic device according to various embodiments.
Figure 8D:
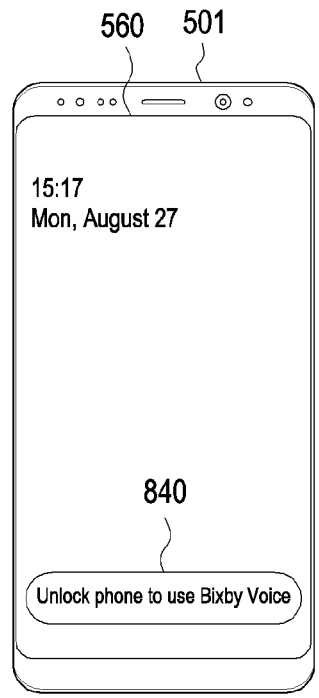
FIG. 8D is a diagram illustrating screen display examples at the time of receiving an input through an input unit in a lock state in an electronic device according to various embodiments.

FIG. 8A is a diagram illustrating screen display examples at the time of receiving an input through an input unit in a lock state in an electronic device according to various embodiments, FIG. 8B is a diagram illustrating screen display examples at the time of receiving an input through an input unit in a lock state in an electronic device according to various embodiments, FIG. 8C is a diagram illustrating screen display examples at the time of receiving an input through an input unit in a lock state in an electronic device according to various embodiments, and FIG. 8D is a diagram illustrating screen display examples at the time of receiving an input through an input unit in a lock state in an electronic device according to various embodiments.

Referring to FIG. 8A, the electronic device 501 (e.g., the UE 100 of FIG. 1, 2A, 2B, or 3, the electronic device 401 of FIG. 4, or the electronic device 501 of FIG. 5) may display a lock screen 810 on the display 560 in a lock state.

Referring to FIG. 8B, the electronic device 501 (e.g., the UE 100 of FIG. 1, 2A, 2B, or 3, the electronic device 401 of FIG. 4, or the electronic device 501 of FIG. 5) may display, on the display 560, an application screen 820 that was being executed before a lock state when an duration of an input is less than or equal to a first threshold time in a state in which a pressure is detected upon receiving an input to the input unit 550 in the lock state and user authentication by a fingerprint recognition sensor succeeds.

Referring to FIG. 8C, the electronic device 501 (e.g., the UE 100 of FIG. 1, 2A, 2B, or 3, the electronic device 401 of FIG. 4, or the electronic device 501 of FIG. 5) may execute an intelligent agent application and display screens 832 and 834 according to the execution of an intelligent agent on the display 560, when a duration of an input to the input unit 550 exceeds a first threshold time in a state in which a pressure is detected upon receiving the input to the input unit 550 in a lock state and user authentication by a fingerprint recognition sensor succeeds. For example, the electronic device 501 may display a first intelligent agent screen (e.g., voice main screen) on the display screen 832 for providing intelligent agent-related information, or may display a second intelligent agent screen (e.g., conversation view) 834 for receiving a voice and having a conversation with the intelligent agent.

Referring to FIG. 8D, the electronic device 501 (e.g., the UE 100 of FIG. 1, 2A, 2B, or 3, the electronic device 401 of FIG. 4, or the electronic device 501 of FIG. 5) may display an unlock request message 840 when a duration of an input to the input unit 550 exceeds a first threshold time in a state in which a pressure is detected upon receiving the input to the input unit 550 in a lock state and user authentication by a fingerprint recognition sensor does not succeed. For example, the unlock request message may be of a toast message type.

Figure 9:
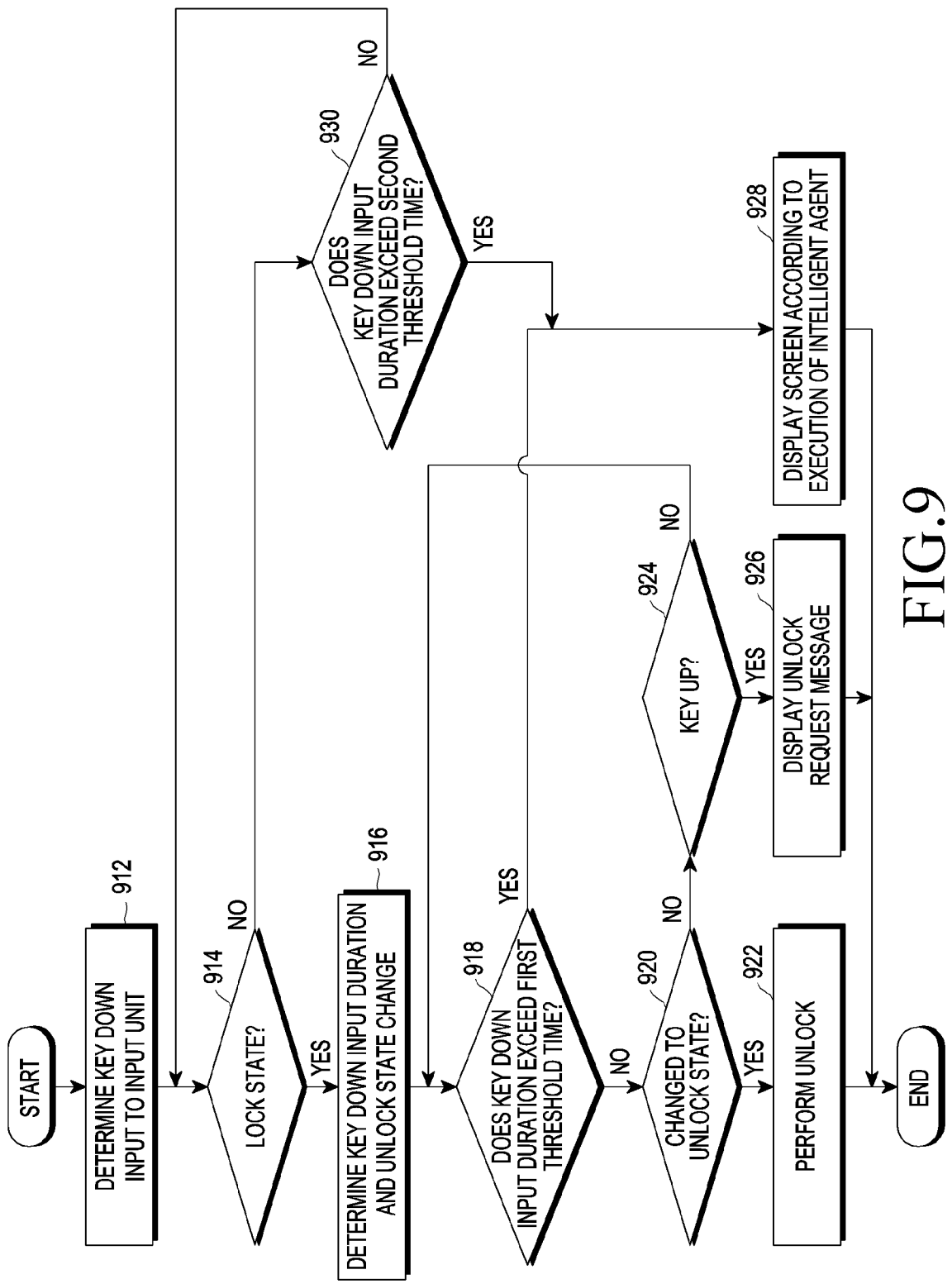
FIG. 9 is a flowchart illustrating an operation at the time of key down input in an electronic device according to various embodiments.

FIG. 9 is a flowchart illustrating an operation at the time of key down input in an electronic device according to various embodiments.

Referring to FIG. 9, operations 912 to 930 according to various embodiments may be understood as operations performed by a processor (e.g., the processor 150 of FIG. 2A, the processor 420 of FIG. 4, or the processor 520 of FIG. 5) of the electronic device 501 (e.g., the UE 100 of FIG. 1, 2A, 2B, or 3, the electronic device 401 of FIG. 4, or the electronic device 501 of FIG. 5). According to an embodiment, at least one of operations 912 to 930 may be omitted, some operations thereof may be reversed, or another operation may be added.

In operation 912, the processor 520 according to various embodiments may determine a key down input to the input unit 550. According to various embodiments, the input unit 550 may include the touch and/or pressure sensor 542 and the fingerprint detector (or fingerprint recognition sensor) 544 as some of at least one sensor 540 (e.g., the sensor 191 of FIG. 2 or the sensor module 476 of FIG. 4). The processor 520 may determine the key down input through touch and/or pressure sensing information obtained by the touch and/or pressure sensor 542. According to various embodiments, the key down may include a button down or an icon touch down on the display. Any user interface in which a user can press to enter data may be possible. For example, the key down input may be a long press input for long-pressing a key for a first time period or more.

In operation 914, the processor 520 according to various embodiments may determine whether the electronic device 501 is in a lock state in response to the key down input to the input unit 550.

In operation 916, the processor 520 according to various embodiments may determine a duration of the key down input and an unlock state change in response to electronic device 501 which is in the lock state. The processor 520 according to various embodiments may determine the duration of the key down input and the unlock state change based on a touch and/or pressure sensing result and a fingerprint sensing result sensed by the input unit 550 including the touch and/or pressure sensor 542 and the fingerprint detector (or fingerprint recognition sensor) 544 in response to the key down input to the input unit 550.

In operation 918, the processor 520 according to various embodiments may determine whether the duration of the key down input exceeds a first threshold time. According to various embodiments, the first threshold time may be a threshold time required until the user authentication is completed and unlocked by the key down input.

In operation 920, the processor 520 according to various embodiments may determine whether the lock state is changed to the unlock state when the duration of the key down input is less than or equal to the first threshold time. According to various embodiments, the processor 520 may be changed to the unlock state based on the fingerprint sensing result in a state in which the duration of the key down input does not exceed the first threshold time.

In operation 922, the processor 520 according to various embodiments may perform unlock when the processor 520 is changed to the unlock state in a state in which the duration of the key down input is less than or equal to the first threshold time. According to various embodiments, after unlock is performed, an application screen that was being executed before the lock state may be displayed on the display 560.

In operation 924, the processor 520 according to various embodiments may determine whether key up is performed when the processor 520 is not changed to the unlock state in a state in which the duration of the key down input is less than or equal to the first threshold time.

In operation 926, the processor 520 according to various embodiments may display an unlock request message on the display 560 in response to the fact that key up is performed while the processor 520 is not changed to the unlock state in a state in which the duration of the key down input is less than or equal to the first threshold time. The processor 520 according to various embodiments may perform operation 918 when key up is not performed while the processor 520 is not changed to the unlock state in the state in which the duration of the key down input is less than or equal to the first threshold time.

In operation 928, the processor 520 according to various embodiments may display an intelligent agent application in response to the fact that the duration of the key down input exceeds the first threshold time in operation 918, and may display a screen according to the execution of an intelligent agent. For example, a second intelligent agent screen (e.g., 834 of FIG. 8) for receiving a voice and having a conversation with the intelligent agent may be displayed in the screen according to the execution of the intelligent agent application.

In operation 930, the processor 520 according to various embodiments may determine whether the duration of the key down input exceeds a second threshold time (e.g., 380 ms) in response to the processor 520 which is not in the lock state after the key down input is determined in operation 914. According to various embodiments, the second threshold time may be a time shorter than the first threshold time. The processor 520 according to various embodiments may proceed to operation 928 to execute the intelligent agent application in response to the fact that the duration of the key down input exceeds the second threshold time (380 ms) in a state in which the processor 520 is not in the lock state after the key down input is determined, and may display a screen according to the execution of the intelligent agent, for example, display a second intelligent agent screen (e.g., 834 of FIG. 8) for receiving a voice and having a conversation with the intelligent agent. The processor 520 according to various embodiments may terminate the corresponding process or may perform another operation in response to the fact that the duration of the key down input does not exceed the second threshold time (380 ms) in a state in which the processor 520 is not in the lock state after the key down input is determined.

Figure 10:
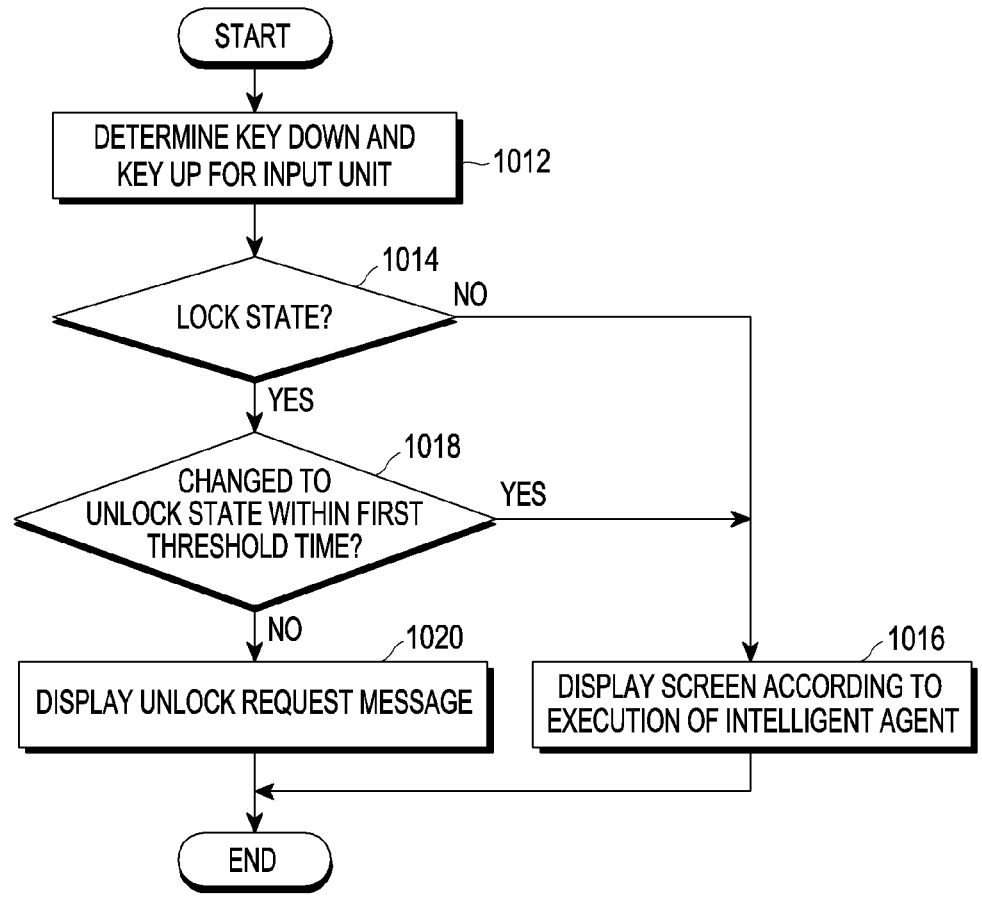
FIG. 10 is a flowchart illustrating an operation at the time of a key down and key up input in an electronic device according to various embodiments.

FIG. 10 is a flowchart illustrating an operation at the time of a key down and key up input in an electronic device according to various embodiments.

Referring to FIG. 10, operations 1012 to 1020 according to various embodiments may be understood as operations performed by a processor (e.g., the processor 150 of FIG. 2A, the processor 420 of FIG. 4, or the processor 520 of FIG. 5) of the electronic device 501 (e.g., the UE 100 of FIG. 1, 2A, 2B, or 3, the electronic device 401 of FIG. 4, or the electronic device 501 of FIG. 5). According to an embodiment, at least one of operations 1012 to 1020 may be omitted, some operations thereof may be reversed, or another operation may be added.

In operation 1012, the processor 520 according to various embodiments may determine a key down and key up input to the input unit 550. For example, the key down and key up input may be a short press input that shortly presses a key for a first period or less.

In operation 1014, the processor 520 according to various embodiments may determine whether the electronic device 501 is in a lock state in response to the determination of the key down and key up inputs.

In operation 1016, the processor 520 according to various embodiments may display a screen according to the execution of an intelligent agent when the state of the electronic device 501 determined in response to the determination of the key down and key up input is not the lock state. According to various embodiments, the processor 520 may execute an intelligent agent application and may display the screen according to the execution of the intelligent agent on the display 560. For example, the processor 520 may display a second intelligent agent screen (e.g., 834 of FIG. 8) for receiving voice and having a conversation with the intelligent agent in the intelligent agent screen.

In operation 1018, the processor 520 according to various embodiments may determine whether the state of the electronic device 501 is changed to the unlock state within a first threshold time when the state of the electronic device 501 determined in response to the determination of the key down and key up input is the lock state.

In operation 1020, the processor 520 according to various embodiments may display an unlock request message on the display 560 when the state of the electronic device 501 is not changed to the unlock state, and may proceed to operation 1016 to display a screen (e.g., a second intelligent agent screen (e.g., 834 of FIG. 8) for receiving a voice and having a conversation with the intelligent agent) according to the execution of the intelligent agent.

Figure 11A:
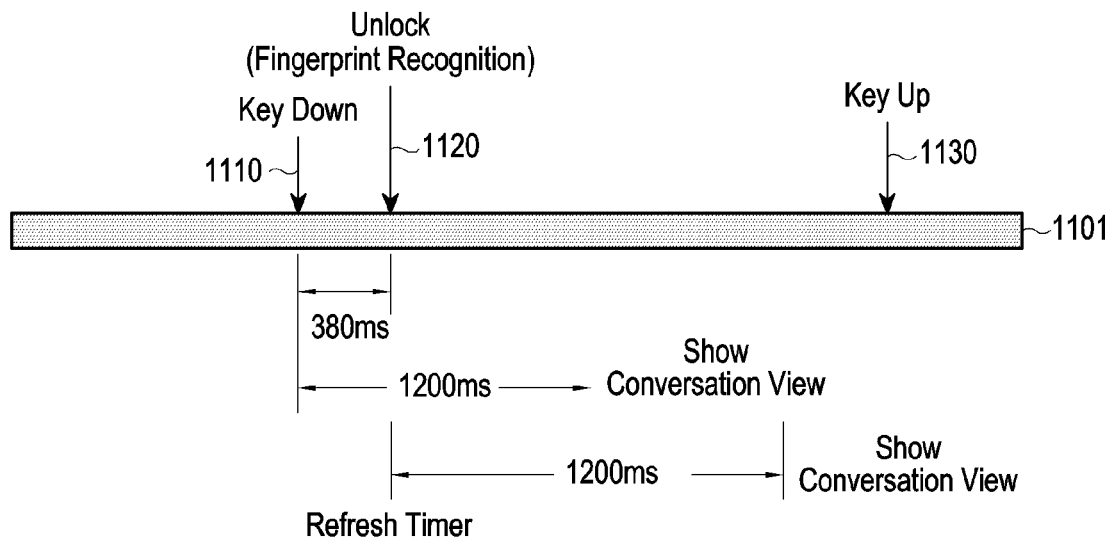
FIG. 11A is a diagram illustrating user authentication and intelligent agent execution processing operations based on an input duration in an electronic device according to various embodiments.
Figure 11B:
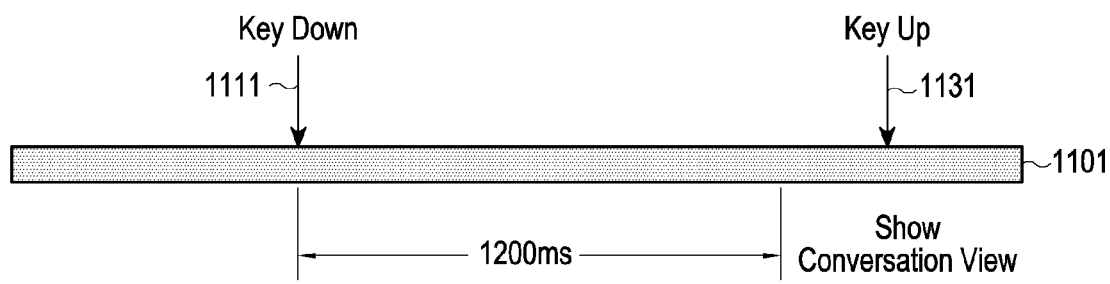
FIG. 11B is a diagram illustrating user authentication and intelligent agent execution processing operations based on an input duration in an electronic device according to various embodiments.
Figure 11C:
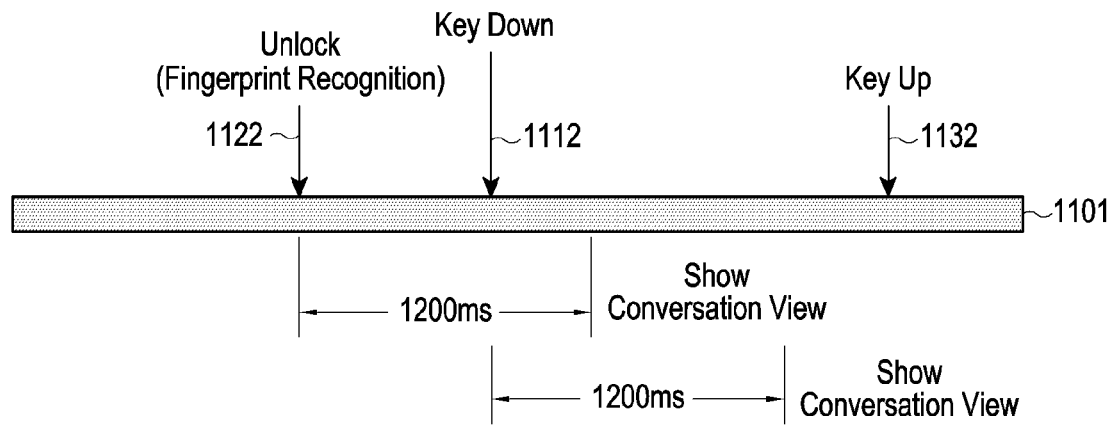
FIG. 11C is a diagram illustrating user authentication and intelligent agent execution processing operations based on an input duration in an electronic device according to various embodiments.
Figure 11D:
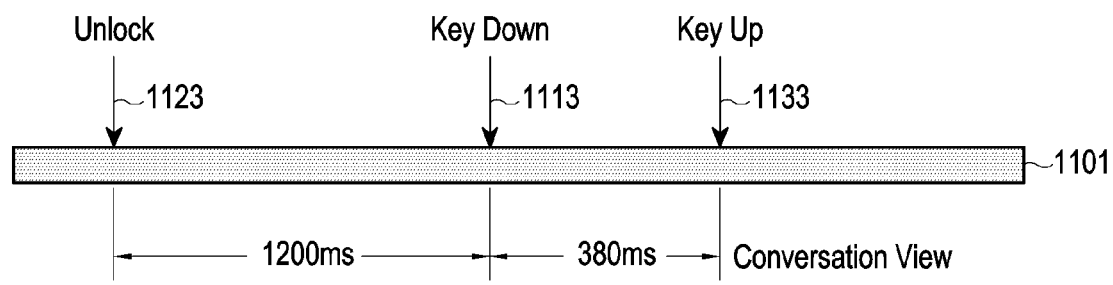
FIG. 11D is a diagram illustrating user authentication and intelligent agent execution processing operations based on an input duration in an electronic device according to various embodiments.
Figure 11E:
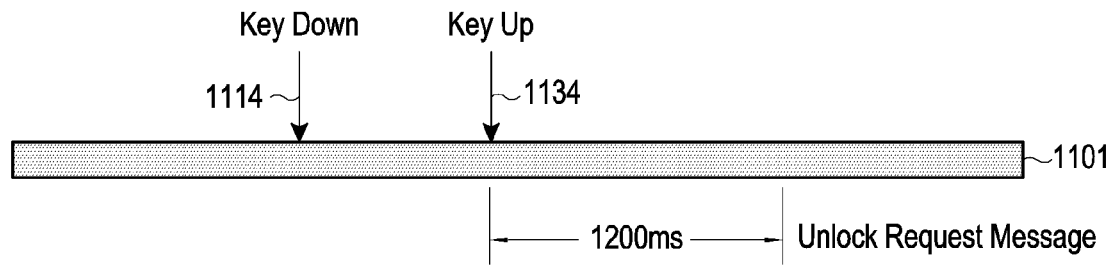
FIG. 11E is a diagram illustrating user authentication and intelligent agent execution processing operations based on an input duration in an electronic device according to various embodiments.
Figure 11F:
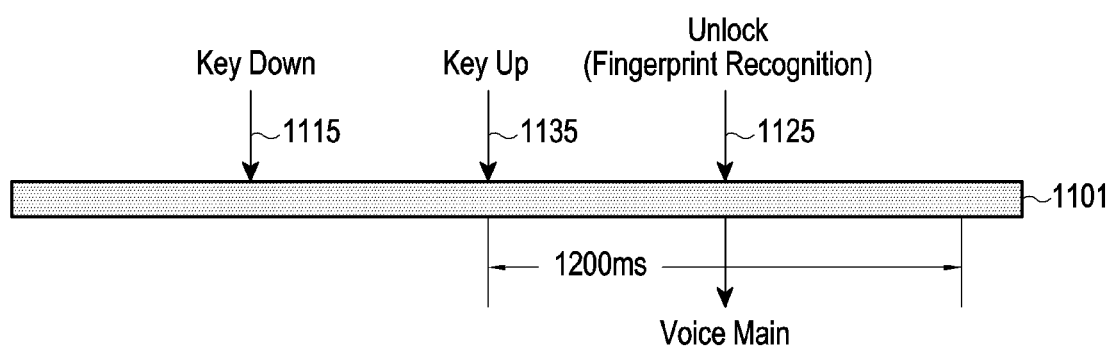
FIG. 11F is a diagram illustrating user authentication and intelligent agent execution processing operations based on an input duration in an electronic device according to various embodiments.
Figure 11G:
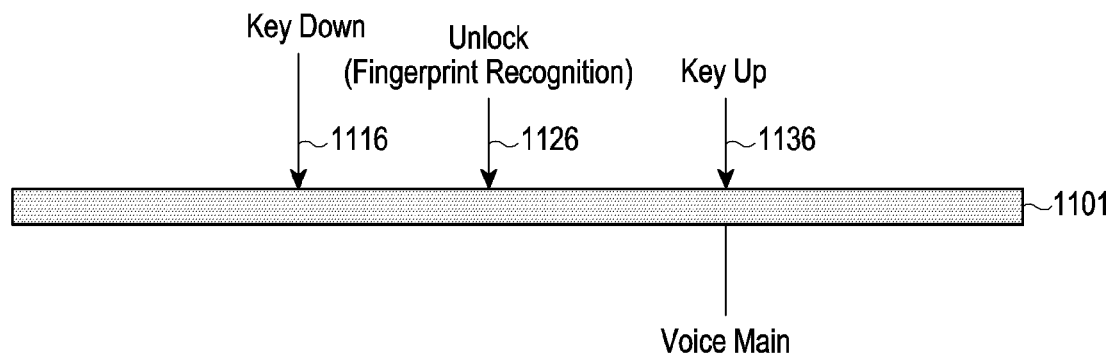
FIG. 11G is a diagram illustrating user authentication and intelligent agent execution processing operations based on an input duration in an electronic device according to various embodiments.
Figure 11H:
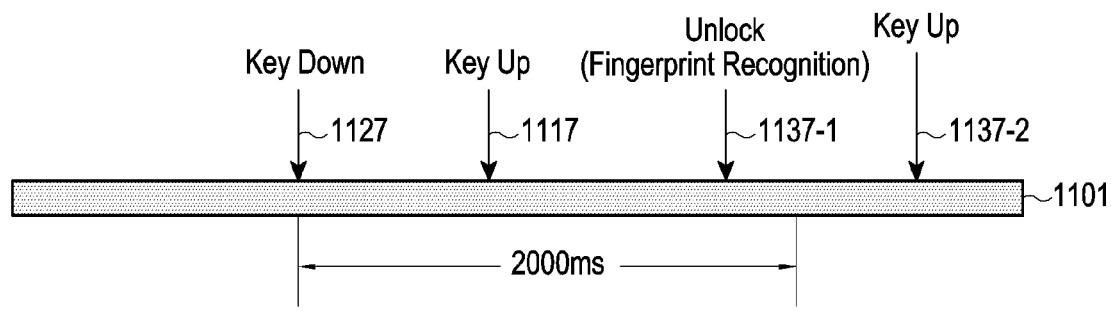
FIG. 11H is a diagram illustrating user authentication and intelligent agent execution processing operations based on an input duration in an electronic device according to various embodiments.

FIG. 11A is a diagram illustrating user authentication and intelligent agent execution processing operations based on an input duration in an electronic device according to various embodiments, FIG. 11B is a diagram illustrating user authentication and intelligent agent execution processing operations based on an input duration in an electronic device according to various embodiments, FIG. 11C is a diagram illustrating user authentication and intelligent agent execution processing operations based on an input duration in an electronic device according to various embodiments, FIG. 11D is a diagram illustrating user authentication and intelligent agent execution processing operations based on an input duration in an electronic device according to various embodiments, FIG. 11E is a diagram illustrating user authentication and intelligent agent execution processing operations based on an input duration in an electronic device according to various embodiments, FIG. 11F is a diagram illustrating user authentication and intelligent agent execution processing operations based on an input duration in an electronic device according to various embodiments, FIG. 11G is a diagram illustrating user authentication and intelligent agent execution processing operations based on an input duration in an electronic device according to various embodiments, and FIG. 11H is a diagram illustrating user authentication and intelligent agent execution processing operations based on an input duration in an electronic device according to various embodiments.

Respective operations according to various embodiments of FIGS. 11A to 11H may be understood as operations performed by a processor (e.g., the processor 150 of FIG. 2A, the processor 420 of FIG. 4, or the processor 520 of FIG. 5) of the electronic device 501 (e.g., the UE 100 of FIG. 1, 2A, 2B, or 3, the electronic device 401 of FIG. 4, or the electronic device 501 of FIG. 5). In FIGS. 11A to 11H, reference numeral 1101 according to various embodiments may be a timeline indicating a passage of time from left to right.

Referring to FIG. 11A, the processor 520 according to various embodiments may operate a first threshold time (e.g., 1200 ms) timer and a second threshold time (e.g., 380 ms) timer when a key down input 1110 is performed. The processor 520 may determine whether the processor 520 is changed to the unlock state within the second threshold time after the key down input 1110. For example, the processor 520 may determine whether unlock (or success of user authentication) is performed by fingerprint recognition within the second threshold time after the key down input 1110. The processor 520 according to various embodiments may ignore the key down input 1110 and a key up input 1130 and may display a lock screen (810 of FIG. 8A) when the unlock 1120 is received after the second threshold time after the key down input 1110 and the key up input 1130 is performed within the first threshold time (e.g., 1200 ms). The processor 520 according to various embodiments may execute the intelligent agent application to correspond to the key up input 1130 and may execute a screen according to the execution of the intelligent application when the unlock 1120 is received after the second threshold time after the key down input 1110 and the key up input 1130 is performed after the passage of the first threshold time (e.g., 1200 ms). For example, the processor may display the second intelligent agent screen (e.g., 834 of FIG. 8C) for receiving a voice and having a conversation with the intelligent agent. According to various embodiments, the processor 520 may refresh the first threshold time (e.g., 1200 ms) timer to operate the refreshed first threshold time (e.g., 1200 ms) timer when the unlock 1120 is received within the second threshold time after the key down input 1110. According to various embodiments, the processor 520 may ignore the key down input 1110 and the key up input 1130 and may display a lock screen (e.g., 810 of FIG. 8A) when the unlock 1120 is received within the second threshold time after the key down input 1110 and the key up input 1130 is performed within the refreshed first threshold time (e.g., 1200 ms). The processor 520 according to various embodiments may execute the intelligent agent application to correspond to the key up input 1130 and may display, on a first display 1262, a screen (e.g., the second intelligent agent screen (e.g., 834 of FIG. 8C) for receiving a voice and having a conversation with the intelligent agent) according to the execution of the intelligent application, when the unlock 1120 is received within the second threshold time after the key down input 1110 and the key up input 1130 is performed in a state in which the refreshed first threshold time (e.g., 1200 ms) is exceeded.

Referring to FIG. 11B, when a key up input 1131 is performed in a state in which the first threshold time (e.g., 1200 ms) is exceeded while the electronic device 501 is not in the lock state (e.g., a different type of lock state other than a lock state using fingerprint recognition is possible) after the key down input 1111 is performed or while the unlock is not received within the first threshold time (e.g., 1200 ms), the processor 520 may execute an intelligent agent application to correspond to the key up input 1131 and may display a screen (e.g., the second intelligent agent screen (e.g., 834 of FIG. 8C) for receiving a voice and having a conversation with the intelligent agent) according to the execution of the intelligent application.

Referring to FIG. 11C, the processor 520 according to various embodiments may operate the first threshold time (e.g., 1200 ms) timer from a key down input 1112 when the electronic device has been already unlocked at the time of the key down input 1112. For example, the electronic device 501 may store a timestamp for the latest unlock event, and may determine whether the electronic device 501 has been unlocked before the key down input 1112 using the stored timestamp. The processor 520 according to various embodiments may ignore the key down input 1112 and a key up input 1132 and may display a lock screen (e.g., 810 of FIG. 8A) when the key up input 1132 is performed within the first threshold time (e.g., 1200 ms) after the key down input 1112 in an unlock state 1122. The processor 520 according to various embodiments may execute the intelligent agent application to correspond to the key up input 1132 and may display a screen (e.g., the second intelligent agent screen (e.g., 834 of FIG. 8C) for receiving a voice and having a conversation with the intelligent agent) according to the execution of the intelligent application when the key up input 1132 is performed in a state in which the first threshold time (e.g., 1200 ms) is exceeded after the key down input 1112 while the processor 520 is in the unlock state.

Referring to FIG. 11D, the processor 520 according to various embodiments may operate the second threshold time (e.g., 380 ms) timer when the electronic device 501 has been already unlocked 1123 upon the key down input 1113 and when a time point at which the electronic device 501 enters an unlock state 1123 is before the first threshold time (e.g., 1200 ms) than a time point of the key down input 1113. The processor 520 according to various embodiments may ignore the key down input 1113 and the key up input 1133 and may display the lock screen (e.g., 810 of FIG. 8A) when the key down input 1113 is performed after the first threshold time (e.g., 1200 ms) in a state in which the processor 520 is in the unlock state 1123 and when the key up input 1133 is performed within the second threshold time (e.g., 380 ms). The processor 520 according to various embodiments may execute the intelligent agent application to correspond to the key up input 1133 and may display a screen (e.g., the second intelligent agent screen (e.g., 834 of FIG. 8C) for receiving a voice and having a conversation with the intelligent agent), when the key down input 1113 is performed after the passage of the first threshold time (e.g., 1200 ms) in a state in which the electronic device is unlocked 1123 and when the key up input 1133 is performed after the passage of the second threshold time (e.g., 380 ms).

Referring to FIG. 11E, the processor 520 according to various embodiments may display an unlock request message (e.g., 840 of FIG. 8D) when the electronic device is not unlocked within the first threshold time (e.g., 1200 ms) after the key down input 1114 and the key up input 1134 (e.g., short press).

Referring to FIG. 11F, the processor 520 according to various embodiments may normally operate the first threshold time timer and may display a first intelligent agent screen (voice main screen) (e.g., 832 of FIG. 8C) for providing intelligent agent-related information after the first threshold time (e.g., 1200 ms), when the processor 520 is not unlocked 1125 within the first threshold time (e.g., 1200 ms) after the key down input 1115 and the key up input 1135. The processor 520 according to various embodiments may display the first intelligent agent screen (voice main screen) (e.g., 832 of FIG. 8C) for providing the intelligent agent-related information at an unlock time point when the electronic device is unlocked 1125 within the first threshold time (e.g., 1200 ms) after the key down input 1115 and the key up input 1135.

Referring to FIG. 11G, the processor 520 according to various embodiments may execute the intelligent agent application at a time point of a key up input 1136 (e.g., short press) when the electronic device is unlocked between a key down input 1116 and the key up input 1136 upon the key down input 1116 and the key up input 1136 (e.g., short press), and may display a screen (e.g., the first intelligent agent screen (voice main screen)(e.g., 832 of FIG. 8C) for providing the intelligent agent-related information) according to the execution of the intelligent application.

Referring to FIG. 11H, the processor 520 according to various embodiments may ignore a first key up input 1137-1 (e.g., short press) during a designated time (e.g., several seconds or 2000 ms) after a key down input 1117 when the electronic device 501 is unlocked 1127, and may receive and process a second key up input 1137-2 (e.g., long press).

Figure 12:
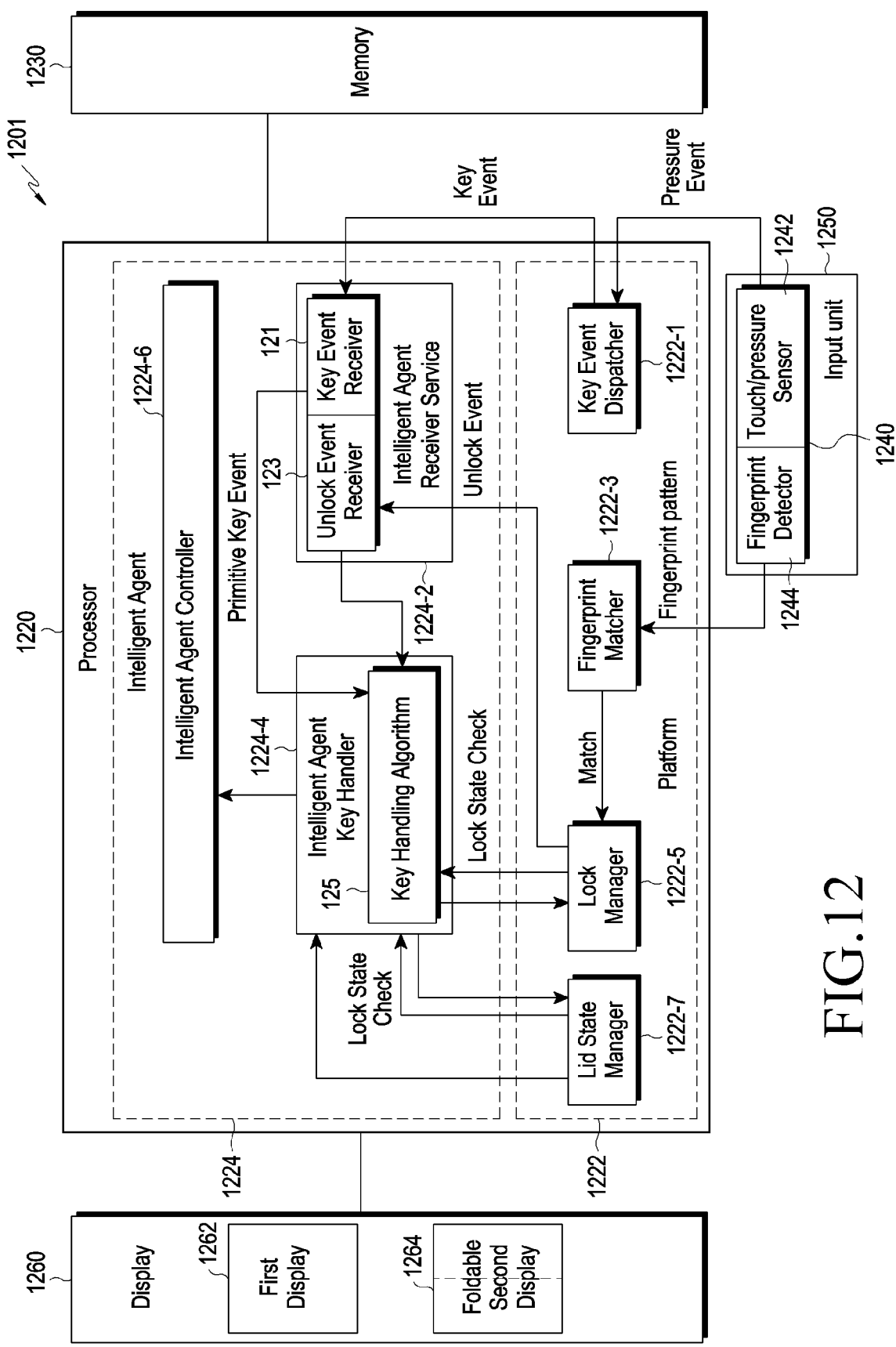
FIG. 12 is a block diagram illustrating an electronic device including a foldable display according to various embodiments.

FIG. 12 is a block diagram illustrating an electronic device 1201 including a foldable display according to various embodiments.

Referring to FIG. 12, the electronic device 1201 (e.g., the UE 100 of FIG. 1, 2A, 2B, or 3, the electronic device 401 of FIG. 4, or the electronic device 501 of FIG. 5) may include: a processor 1220 (e.g., the processor 150 of FIG. 2A, the processor 420 of FIG. 4, or the processor 520 of FIG. 5); a memory 1230 (e.g., the memory 140 of FIG. 2A, the memory 430 of FIG. 4, or the memory 530 of FIG. 5), at least one sensor 1240 (e.g., the sensor 191 of FIG. 2A, the sensor module 476 of FIG. 4, or the at least one sensor 540 of FIG. 5), an input unit 1250 (e.g., the input module 110 of FIG. 2A, the input unit (e.g., a hardware key) 112 of FIG. 3, the input device 450 of FIG. 4, or the input unit 550 of FIG. 5), and a display 1260 (e.g., the display 120 of FIG. 2A, the display 120 of FIG. 3, the display device 460 of FIG. 4, or the display 560 of FIG. 5).

The operations of the components of the electronic device 1201 according to various embodiments may be performed in the same manner as that in the components of the electronic device 501 of FIG. 5. The electronic device 1201 according to various embodiments may further perform operations different from those of the components. Hereinafter, in the following description with reference to FIG. 12, only a case in which operations different from the components of the electronic device 501 of FIG. 5 are performed will be described, and the same operation as the electronic device 501 of FIG. 5 may be replaced with the contents described with reference to FIG. 5.

According to various embodiments, the display 1260 of the electronic device 1201 may include a first display 1262 and/or a foldable second display (e.g., a foldable display) 1264. According to various embodiments, the processor 1220 of the electronic device 1201 may include the component of the processor 520 of the electronic device 501 of FIG. 5, and may further include a lid state manager 1222-7. According to various embodiments, the processor 1220 may determine a folded state or an unfolded state of the second display 1264 through the lid state manager 1222-7. According to various embodiments, the electronic device 1201 may further include a detector configured to detect a folded state or an unfolded state of the foldable second display (e.g., the foldable display) 1264. The folded state or unfolded state of the second display 1264 may be determined through the lid state manager 1222-7 using a detection signal of the detector.

According to various embodiments, the processor 1220 may display, on the first display 1262, a screen (e.g., the second intelligent agent screen (e.g., 834 of FIG. 8C) for receiving a voice and having a conversation with the intelligent agent) according to the execution of the intelligent agent in response to an input to the input unit 1250 when the electronic device 1201 is in a lock state and the second display 1264 is in a folded state, and may stop the execution of the intelligent agent and stop the display of the screen according to the execution of the intelligent agent on the first display 1262 when the second display 1264 enters an unfolded state within a third threshold time after the input. According to various embodiments, the processor 1220 may ignore an input to the input unit 1250 when the electronic device 1201 is changed from the unfolded state to the folded state and the input to the input unit 1250 is received within the third threshold time after the folded state.

Figure 13A:
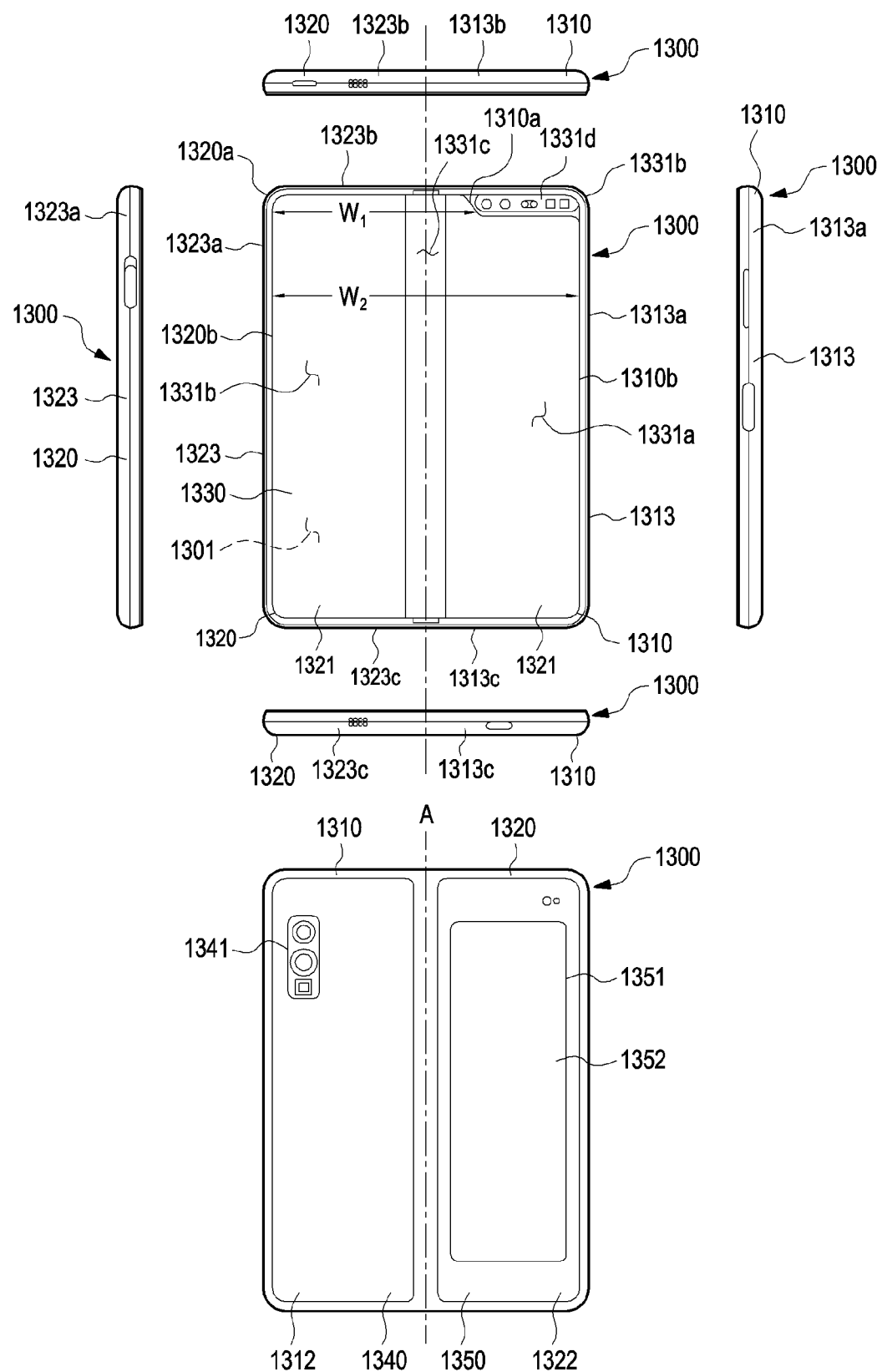
FIG. 13A is a view illustrating a folded state of an electronic device including a foldable display according to various embodiments.
Figure 13B:
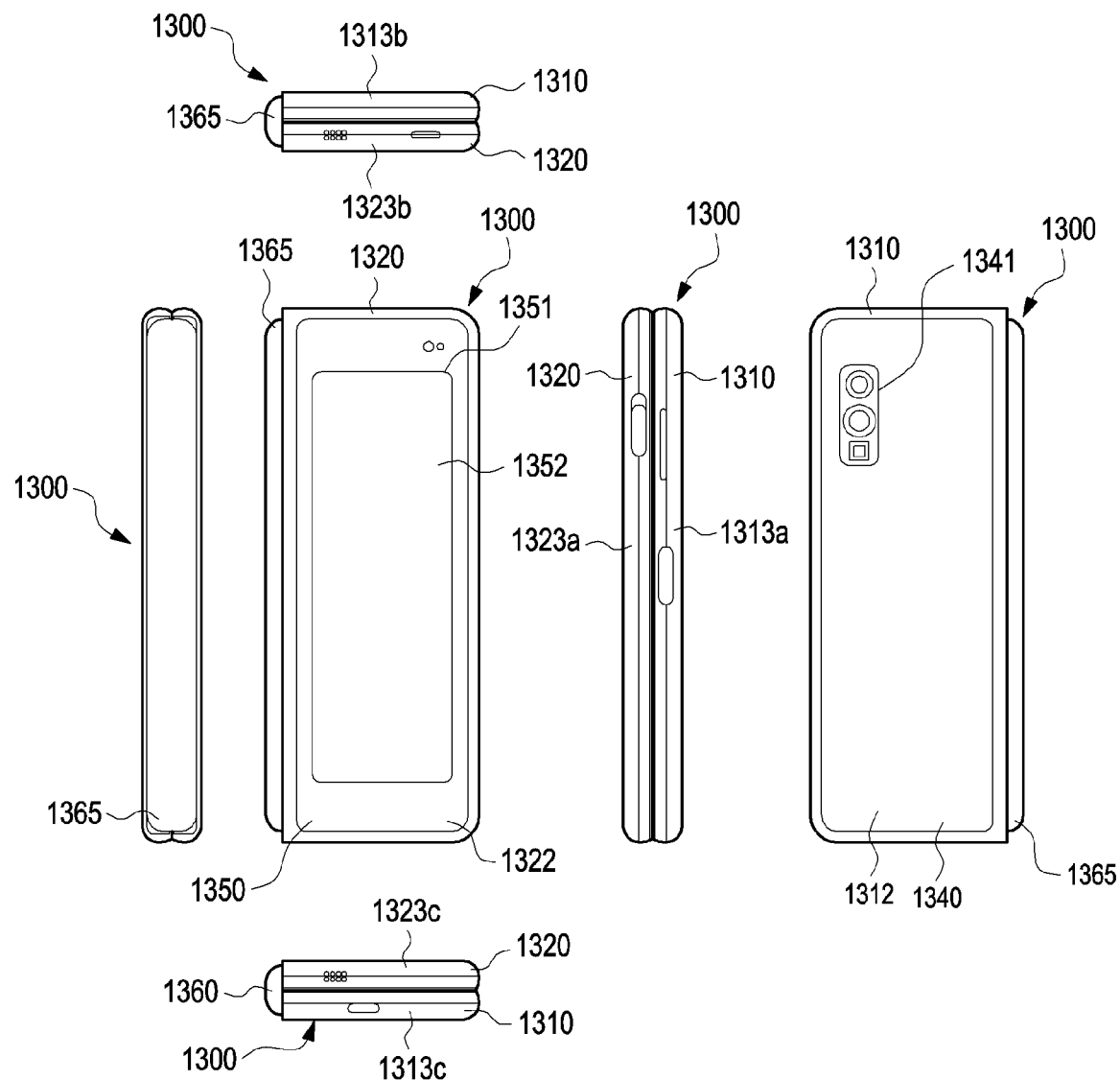
FIG. 13B is a diagram illustrating an unfolded state of an electronic device including a foldable display according to various embodiments.

FIG. 13A is a view illustrating a folded state of an electronic device 1300 including a foldable display according to various embodiments, and FIG. 13B is a diagram illustrating an unfolded state of an electronic device 1300 including the foldable display of FIG. 13A according to various embodiments.

The electronic device 1300 of FIGS. 13A and 13B may be at least partially similar to the UE 100 of FIG. 1, 2A, 2B, or 3, the electronic device 401 of FIG. 4, the electronic device 501 of FIG. 5, or the electronic device 1201 of FIG. 12, or may include other embodiments of the electronic device.

Referring to FIGS. 13A and 13B, the electronic device 1300 may include: a pair of housing structures 1310 and 1320 configured to be rotatably coupled through a hinge structure 1365 to be folded with respect to each other, and a display 1330 (e.g., a flexible display or a foldable display) disposed in a space formed by the pair of housing structures 1310 and 1320. In some embodiments, the hinge structure 1365 may include a hinge cover. According to an embodiment, the electronic device 1300 may include a foldable housing to be rotatably coupled from a position in which the pair of housing structures 1310 and 1320 are hinged to face each other to a position in which the pair of housing structures 1310 and 1320 are parallel to each other. In this document, a surface on which the display 1330 is disposed may be defined as a front surface of the electronic device 1300, and a surface opposite the front surface may be defined as a rear surface of the electronic device 1300. In addition, a surface surrounding a space between the front and rear surfaces may be defined as a side surface of the electronic device 1300.

In an embodiment, the pair of housing structures 1310 and 1320 may include the first housing structure 1310 including a sensor region (or sensor placement region) 1331*d*, a second housing structure 1320, a first rear cover 1340, and a second rear cover 1350. The pair of housing structures

1310 and 1320 of the electronic device 1300 are not limited to the shapes and the combinations shown in FIGS. 13A and 13B, and may be implemented by the combination or coupling of other shapes or components. For example, in another embodiment, the first housing structure 1310 and the first rear cover 1340 may be integrally formed, and the second housing structure 1320 and the second rear cover 1350 may be integrally formed.

According to an embodiment, the first housing structure 1310 and the second housing structure 1320 may be disposed on both sides with respect to a first axis, for example, a folding axis A, and may have a shape that is generally symmetric with respect to the folding axis A. In some embodiments, the first housing structure 1310 and the second housing structure 1320 may be rotated about the hinge structure 1365 or the hinge cover with respect to different folding axes. For example, the first housing structure 1310 and the second housing structure 1320 may be rotatably coupled to the hinge structure 1365 or the hinge cover, respectively, and may be rotated about the folding axis A or the different folding axes, so that they may be rotated between a position inclined with respect to each other or a position next to each other from a folded position.

In this document, "positioned next to each other" or "extended next to each other" refers to a state in which two structures are at least partially positioned next to each other or parts positioned at least next to each other are disposed in parallel. In some embodiments, "positioned next to each other" may mean that two structures are positioned next to each other while facing in a parallel direction or in the same direction. Expressions such as "next to each other", "parallel", and the like may be used in the following detailed description, which will be readily understood according to the shape or arrangement of the structures with reference to the accompanying drawings.

According to an embodiment, an angle formed by the first housing structure 1310 and the second housing structure 1320 or a distance therebetween may be changed according to whether the electronic device 1300 is in a folded state (an extended state, a flat state, or an open state)(e.g., an expanded state), in an unfolded state (e.g., a closed state), or in an intermediate state (e.g., a being unfolded state). According to an embodiment, unlike the second housing structure 1320, the first housing structure 1310 may further include the sensor region 1331*d* in which various sensors are disposed, but may have a symmetrical shape in other regions. In another embodiment, the sensor region 1331*d* may be further disposed in at least a partial region of the second housing structure 1320 or replaced.

In an embodiment, the first housing structure 1310 may include a first surface 1311 configured to be connected to the hinge structure 1365 in a folded state of the electronic device 1300 and disposed to face the front surface of the electronic device 1300, a second surface 1312 configured to face a direction opposite the first surface 1311, and a first side member 1313 configured to surround at least a part of a space between the first surface 1311 and the second surface 1312. In an embodiment, the first side member 1313 may include a first side surface 1313*a* disposed in parallel with the folding axis A, a second side surface 1313*b* extending in a direction perpendicular to the folding axis A from one end of the first side surface 1313*a*, and a third side surface 1313*c* extending in a direction perpendicular to the folding axis A from the other end of the first side surface 1313*a*. In describing various embodiments of the disclosure, expressions such as "in parallel" or "perpendicular to" are used for the arrangement of the above-described side surfaces, but depending on the embodiment, it may include "partially in parallel" or "partially perpendicular to". In some embodiments, the expressions such as "in parallel" or "perpendicular to" may mean including an inclined arrangement relationship in an angular range within 10 degrees.

In an embodiment, the second housing structure 1320 may include a third surface 1321 connected to the hinge structure 1365 and disposed to face the front surface of the electronic device 1300 in an unfolded state of the electronic device 1300, a fourth surface 1322 facing a direction opposite the third surface 1321, and a second side member 1323 surrounding at least a part of a space between the third surface 1321 and the fourth surface 1322. In an embodiment, the second side member 1323 may include a fourth side surface 1323*a* disposed in parallel with the folding axis A, a fifth side surface 1323*b* extending in a direction perpendicular to the folding axis A from one end of the fourth side surface 1323*a*, and a sixth side surface 1323*c* extending in a direction perpendicular to the folding axis A from the other end of the fourth side surface 1323*a*. In an embodiment, the third surface 1321 may face the first surface 1311 in a folded state. In some embodiments, although there are some differences in specific shapes, the second side member 1323 may be made of substantially the same shape or material as the first side member 1313.

In an embodiment, the electronic device 1300 may include a recess 1301 formed to receive a display 1330 (e.g., the foldable second display 1264 of FIG. 12) through a structural shape combination of the first housing structure 1310 and the second housing structure 1320. The recess 1301 may have substantially the same size as the display 1330. In one embodiment, due to the sensor region 1331*d*, the recess 1301 may have two or more widths different from each other in a direction perpendicular to the folding axis A. For example, the recess 1301 may have a first width W1 between a first portion 1310*a* of the second housing structure 1320 that is parallel to the folding axis A and a first portion 1310*a* of the first housing structure 1310 that is formed on the periphery of the sensor area 1331*d* and a second width W2 between a second portion 1320*b* of the second housing structure 1320 and a second portion 1320*b* of the first housing structure 1310 that does not correspond to the sensor area 1331*d* and that is parallel to the folding axis A. In this case, the second width W2 may be longer than the first width W1. For example, the recess 1301 may be formed to have the first width W1 between the first portion 1310*a* of the first housing structure 1310 and the first portion 1320*a* of the second housing structure 1320 that have mutually asymmetric shapes and the second width W2 between the second portion 1310*b* of the first housing structure 1310 and the second portion 1320*b* of the second housing structure 1320 that have mutually symmetric shapes. In an embodiment, the first portion 1310*a* and second portion 1310*b* of the first housing structure 1310 may be formed to have a mutually different distance from the folding axis A. The width of the recess 1301 is not limited to the illustrated example. In various embodiments, the recess 1301 may have two or more different widths by the shape of the sensor region 1331*d* or by a portion having an asymmetric shape of the first housing structure 1310 and the second housing structure 1320.

In an embodiment, at least some of the first housing structure 1310 and the second housing structure 1320 may be formed of a metal material or a non-metal material having rigidity with a magnitude selected to support the display 1330. In another embodiment, the at least some of the first housing structure 1310 and the second housing structure 1320 may include an electrically conductive material. When the first housing structure 1310 and the second housing structure 1320 include a conductive material, the electronic device 1300 may transmit and receive radio waves using the portion made of the conductive material of the first housing structure 1310 and the second housing structure 1320. For example, a processor or communication module (e.g., the processor 420 or communication module 490 of FIG. 4) of the electronic device 1300 may utilize the portion of the first housing structure 1310 and the second housing structure 1320 to perform wireless communication.

In an embodiment, the sensor region 1331d may be formed to have a predetermined region adjacent to one corner of the first housing structure 1310. However, the arrangement, shape, or size of the sensor region 1331d is not limited to the illustrated example. For example, in another embodiment, the sensor region 1331d may be provided at another corner of the first housing structure 1310 or an arbitrary region between the top and bottom corners. In another embodiment, the sensor region 1331d may be disposed in at least partial region of the second housing structure 1320. In another embodiment, the sensor region 1331d may be disposed to extend from the first housing structure 1310 and the second housing structure 1320. In an embodiment, the electronic device 1300 may include components exposed to the front surface of the electronic device 1300 through the sensor region 1331d or through one or more openings provided in the sensor region 1331d, and may perform various functions through such components. The components disposed in the sensor region 1331d may include at least one of, for example, a front camera device (e.g., the camera module 480 of FIG. 4), a receiver (e.g., the audio module 470 of FIG. 4), a proximity sensor, an illuminance sensor, an iris recognition sensor, an ultrasonic sensor (e.g., the sensor module 476 of FIG. 4), or an indicator.

In an embodiment, the first rear cover 1340 may be disposed on the second surface 1312 of the first housing structure 1310 and may have a substantially rectangular periphery. In an embodiment, the periphery of the first rear cover 1340 may be at least partially wrapped by the first housing structure 1310. Similarly, the second rear cover 1350 may be disposed on the fourth surface 1322 of the second housing structure 1320, and at least a portion of the periphery of the second rear cover 1350 may be wrapped by the second housing structure 1320.

In the illustrated embodiment, the first rear cover 1340 and the second rear cover 1350 may have a substantially symmetrical shape with respect to the folding axis A. In another embodiment, the first rear cover 1340 and the second rear cover 1350 may include various different shapes. In another embodiment, the first rear cover 1340 may be integrally formed with the first housing structure 1310, and the second rear cover 1350 may be integrally formed with the second housing structure 1320.

In an embodiment, the first rear cover 1340, the second rear cover 1350, the first housing structure 1310, and the second housing structure 1320 may provide a space in which various components (e.g., a printed circuit board, an antenna module, a sensor module, or a battery) of the electronic device 1300 through a mutually combined structure can be disposed. In an embodiment, one or more components may be disposed or visually exposed on the rear surface of the electronic device 1300. For example, one or more components or sensors may be visually exposed through a first rear region 1341 of the first rear cover 1340. In various embodiments, the sensor may include a proximity sensor, a rear camera device, and/or a flash. In another embodiment, at least a portion of a subdisplay 1352 may be visually exposed through the second rear region 1351 of the second rear cover 1350.

The display 1330 may be disposed in a space formed by the pair of housing structures 1310 and 1320. For example, the display 1330 may be seated in a recess formed by the pair of housing structures 1310 and 1320 and may be disposed to occupy substantially the majority of the front surface of the electronic device 1300. For example, the front surface of the electronic device 1300 may have the display 1330, a partial region (e.g., a peripheral region) of the first housing structure 1310 adjacent to the display 1330, and a partial region (e.g., a peripheral region) of the second housing structure 1320. In an embodiment, the rear surface of the electronic device 1300 may include a first rear cover 1340, a partial region (e.g., a peripheral region) of the first housing structure 1310 adjacent to the first rear cover 1340, a second rear cover 1350, and a partial region (e.g., a peripheral region) of the second housing structure 1320 adjacent to the second rear cover 1350.

In an embodiment, the display 1330 may refer to a display in which at least some regions may be transformed into a flat or curved surface. In an embodiment, the display 1330 may include a folding region 1331c, a first region 1331a disposed on one side (the right side of the folding region 1331c) with respect to the folding region 1331c, and a second region 1331b disposed on the other side (e.g., the left side of the folding region 1331c). For example, the first region 1331a may be disposed on the first surface 1311 of the first housing structure 1310, and the second region 1331b may be disposed on the third surface 1321 of the second housing structure 1320. For example, the display 1330 may extend from the first surface 1311 to the third surface through the hinge structure 1365, and a region (e.g., the folding region 1331c) corresponding to at least the hinge structure may be a flexible region that is deformable into a curved shape.

In an embodiment, the division of the region of the display 1330 is merely an example, and the display 1330 may be divided into a plurality of regions (e.g., four or more or two) according to structure or function. For example, in the embodiment shown in FIG. 13A, the folding region 1331c may extend in a longitudinal axis direction parallel to the folding axis A, and the regions of the display 1330 may be divided by the folding region 1331c or the folding axis (A axis), but in another embodiment, the regions of the display 1330 may be divided based on a folding region in parallel to another folding region (e.g., the horizontal axis) or the other folding axis. The aforementioned region division of the display is only a physical division by the pair of housing structures 1310 and 1320 and the hinge structure 1365, and the display 1330 may substantially display one full screen through the pair of housing structures 1310 and 1320 and the hinge structure 1365.

According to an embodiment, the first region 1331a and the second region 1331b may have a symmetrical shape as a whole with respect to the folding region 1331c. However, unlike the second region 1331b, the first region 1331a may include a notch region that provides the sensor region 1331d, and in other regions, the first region 1331a may have a shape symmetrical with the second region 1331b. For example, the first region 1331a and the second region 1331b may include portions having symmetrical shapes and portions having asymmetrical shapes.

Referring to FIG. 13B, the hinge structure 1365 may be disposed between the first housing structure 1310 and the second housing structure 320 to cover the internal components. For simplicity, the hinge structure 1365 is disclosed without being distinct from the hinge cover, but the hinge cover may partially form the appearance of the electronic device 1300 as a portion of the hinge structure 1365. In an embodiment, the hinge cover of the hinge structure 1365 may be covered by portions of the first housing structure 1310 and the second housing structure 1320 or exposed to the outside according to an operating state (folded state or unfolded state) of the electronic device 1300.

For example, as shown in FIG. 13A, when the electronic device 1300 is in an unfolded state, the hinge structure 1365 may be covered by the first housing structure 1310 and the second housing structure 1320 to prevent from being exposed. As another example, as shown in FIG. 3, when the electronic device 1300 is in an unfolded state (e.g., a completely folded state), the hinge structure 1365 may be exposed to the outside between the first housing structure 1310 and the second housing structure 1320. As another example, when the first housing structure 1310 and the second housing structure 1320 are in an intermediate state in which the first housing structure 1310 and the second housing structure 1320 form a certain angle (folded with a certain angle), a portion of the hinge cover of the hinge structure 1365 may be exposed to the outside of the electronic device 1300 from between the first housing structure 1310 and the second housing structure 1320. In this case, the exposed region may be smaller than a region in the fully folded state. In an embodiment, the hinge cover may include a curved surface.

Hereinafter, the operations of the first housing structure 1310 and the second housing structure 1320 and each region of the display 1330 according to an operating state (e.g., unfolded state and folded state) of the electronic device 1300 will be described.

In an embodiment, when the electronic device 1300 is in an unfolded state (e.g., the state of FIG. 13A), the first housing structure 1310 and the second housing structure 1320 may form an angle of 180 degrees, and the first region 1331*a* and the second region 1331*b* of the display may be disposed to display a screen to face the same direction, for example, in a direction parallel to each other. In addition, the folding region 1331*c* may form the same plane with the first region 1331*a* and the second region 1331*b*.

In an embodiment, when the electronic device 1300 is in a folded state (e.g., the state of FIG. 13B), the first housing structure 1310 and the second housing structure 1320 may be disposed to face each other. For example, when the electronic device 1300 is in the folded state (e.g., the state of FIG. 13B), the first region 1331*a* and the second region 1331*b* of the display 1330 may form a mutually narrow angle (e.g., between 0 degrees and 10 degrees) and may face each other. When the electronic device 1300 is in the folded state (e.g., the state of FIG. 13B), the folding region 1331*c* may form a curved surface of which at least a portion has a predetermined curvature.

In an embodiment, when the electronic device 1300 is in an intermediate state, the first housing structure 1310 and the second housing structure 1320 may be disposed to form a certain angle. For example, in the intermediate state, the first region 1331*a* and the second region 1331*b* of the display 1330 may form an angle larger than the folded state and smaller than the unfolded state. The folding region 1331*c* may be formed of a curved surface of which at least a part has a predetermined curvature, and at this time, the curvature may be smaller than that in the folded state.

Figure 14A:
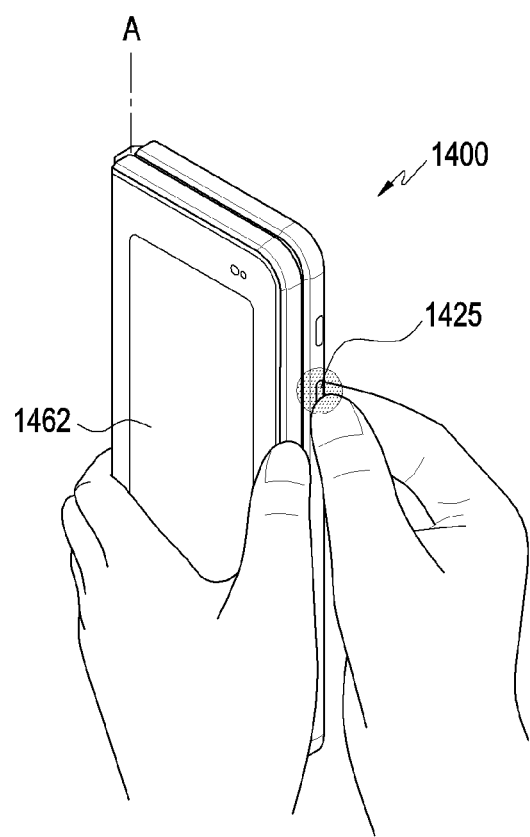
FIG. 14A is a diagram illustrating a state in which an electronic device according to various embodiments is folded with respect to a folding axis.
Figure 14B:
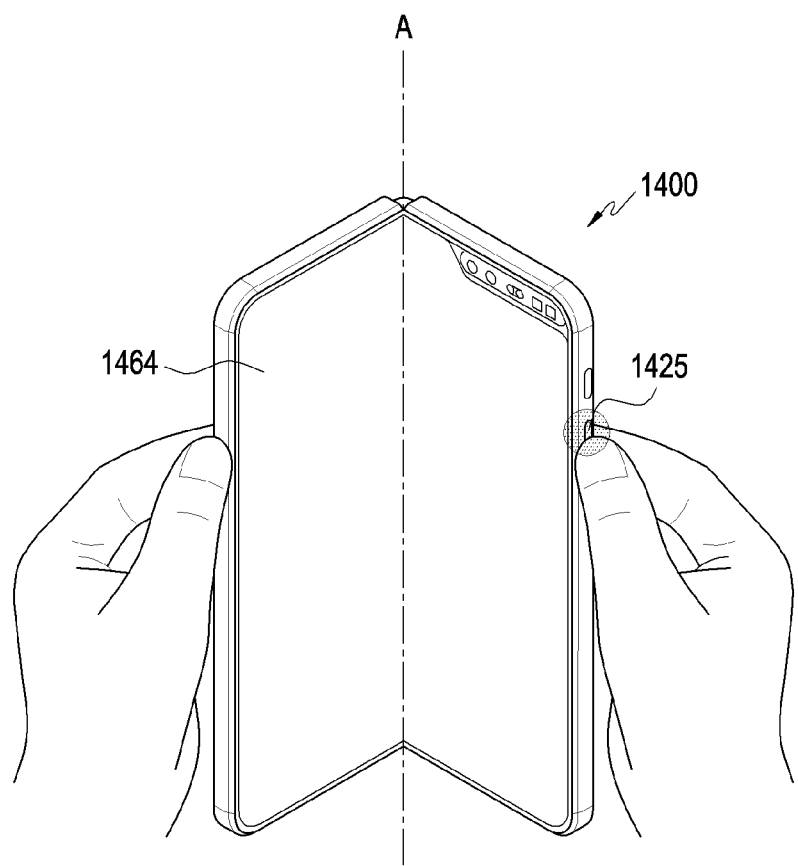
FIG. 14B is a diagram illustrating a state in which an electronic device according to various embodiments is unfolded with respect to a folding axis.

FIG. 14A is a diagram illustrating a state in which an electronic device 1400 according to various embodiments is folded with respect to a folding axis, and FIG. 14B is a diagram illustrating a state in which the electronic device 1400 according to various embodiments is unfolded with respect to a folding axis.

When the electronic device 1400 is unfolded by a user in a folded state as shown in FIG. 14A, the electronic device 1400 may be in an unfolded state as shown in FIG. 14B.

Referring to FIGS. 14A and 14B, in a process of being unfolded by the user in the folded state of the electronic device 1400, an input unit 1425 (e.g., a key for an execution input of a user authentication function and an intelligent agent function) may be wrongly pressed by the user. For example, the user does not intend an input to the input unit 1425 and causes the electronic device 1400 to be in an unfolded state, but may inadvertently apply a pressure by a finger (e.g., a thumb) to the input unit 1425.

Referring to FIG. 14A, before the electronic device 1400 is unfolded by a user in a folded state, the input unit 1425 (e.g., a key for an execution input of a user authentication function and an intelligent agent function) may be wrongly pressed by the user. As the electronic device 1400 according to various embodiments is unfolded by the user in the folded state, the user authentication function and the intelligent agent function may be executed by an unintentional input of the input unit 1425 so that an intelligent agent application execution screen may be displayed on a first display 1462.

Referring to FIG. 14B, the input unit 1425 (e.g., a key for an execution input of a user authentication function and an intelligent agent function) may be incorrectly pressed by the user while the electronic device 1400 starts to be unfolded by the user in the folded state and is being unfolded. In a state in which the electronic device 1400 according to various embodiments is unfolded, the user authentication function and the intelligent agent function may be executed by the unintentional input of the input unit 1425, and the intelligent agent application execution screen may be displayed on a foldable second display 1464 which has been in the unfolded state.

Figure 15:
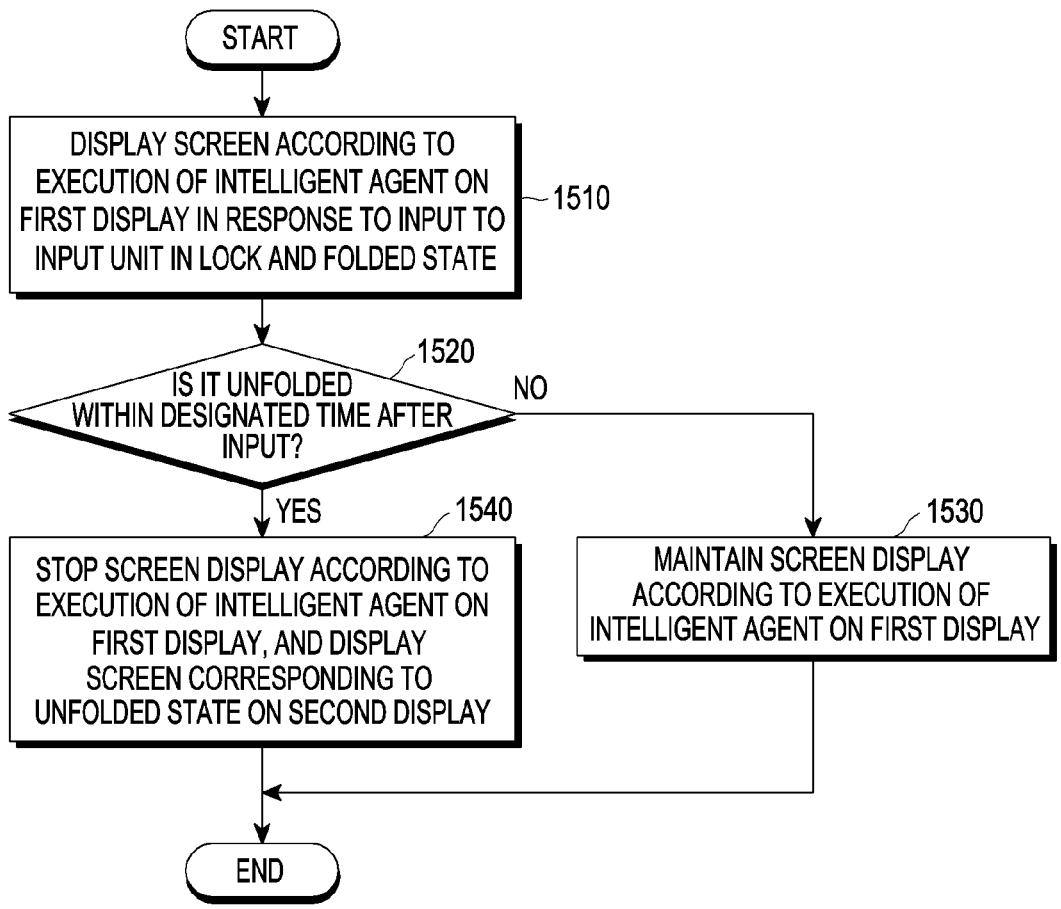
FIG. 15 is a flowchart illustrating an operation when an input is received at an input unit by a user before an electronic device according to various embodiments is unfolded by the user in a folded state.

FIG. 15 is a flowchart illustrating an operation when an input is received at an input unit by a user before an electronic device according to various embodiments is unfolded by the user in a folded state.

Referring to FIG. 15, operations 1510 to 1540 according to various embodiments may be understood as operations performed by a processor (e.g., the processor 150 of FIG. 2A, the processor 420 of FIG. 4, the processor 520 of FIG. 5, or the processor 1220 of FIG. 12) of an electronic device (e.g., the UE 100 of FIG. 1, 2A, 2B, or 3, the electronic device 401 of FIG. 4, the electronic device 501 of FIG. 5, the electronic device 1201 of FIG. 12, the electronic device 1300 of FIGS. 13A and 13B, or the electronic device 1400 of FIG. 14A or 14B). According to an embodiment, at least one of operations 1510 to 1540 may be omitted, some operations thereof may be reversed, or another operation may be added.

In operation 1510, the processor 1220 according to various embodiments may display a screen according to the execution of the intelligent agent on a first display 1262 in response to an input to the input unit 1250 while the electronic device 1201 is locked and folded. For example, in a case in which the electronic device 1201 is in a lock state and is in a folded state, when user authentication succeeds in response to the input to the input unit 1250 and a duration of the input exceeds a first threshold time, the processor 1220 may execute the intelligent agent and may display a second intelligent agent screen for receiving a voice and having a conversation with the intelligent agent.

In operation 1520, the processor 1220 according to various embodiments may determine whether the electronic device is changed to the unfolded state within a predetermined time after the input. For example, the processor 1220 may determine whether the electronic device is changed to the unfolded state within a designated time after the input in order to identify whether an unintentional input occurs in the input unit 1250 in the operation of the user for changing the electronic device 1201 from the folded state to the unfolded state. The designated time may be a time within a few seconds (e.g. 1 second) immediately after the input.

In operation 1530, the processor 1220 according to various embodiments may maintain the screen display according to the execution of the intelligent agent on the first display 1262 unless the electronic device is changed to the unfolded state within the predetermined time after the input.

In operation 1540, the processor 1220 according to various embodiments may stop the screen display according to the execution of the intelligent agent on the first display 1262 in response to the change to the unfolded state within the designated time after the input, and may display a screen corresponding to the unfolded state on the second display 1264. In this case, the intelligent agent function may be stopped.

Figure 16A:
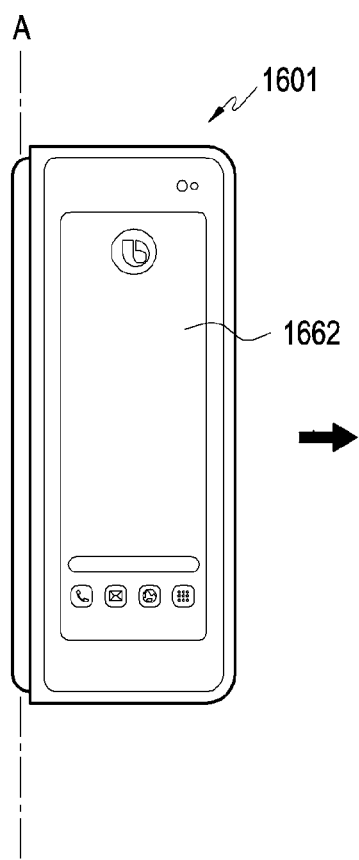
FIG. 16A is a diagram illustrating a display example when an input is received at an input unit by a user before an electronic device according to various embodiments is unfolded by the user in a folded state.
Figure 16B:
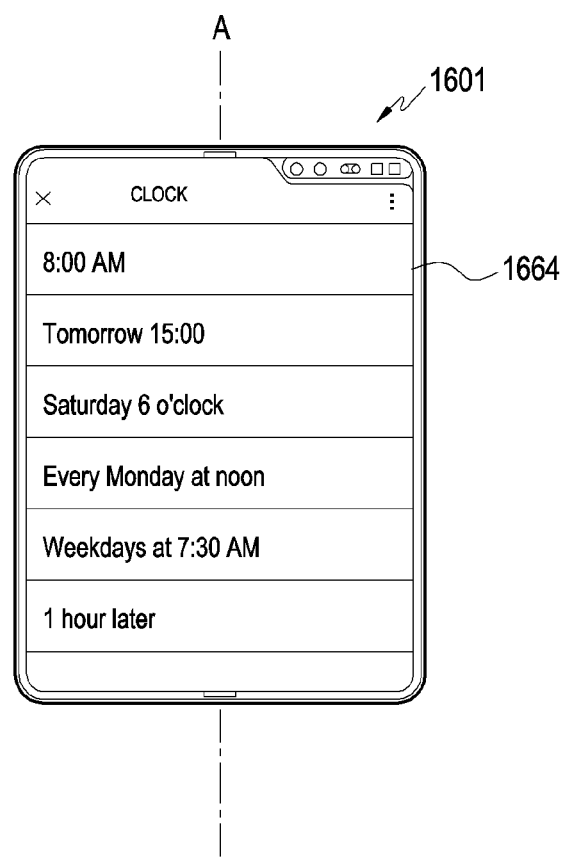
FIG. 16B is a diagram illustrating a display example when an input is received at an input unit by a user before an electronic device according to various embodiments is unfolded by the user in a folded state.

FIGS. 16A and 16B are diagrams illustrating a display example when an input is received at an input unit by a user in a state in which an electronic device according to various embodiments is folded.

Referring to FIG. 16A, an electronic device 1601 (e.g., the UE 100 of FIG. 1, 2A, 2B, or 3, the electronic device 401 of FIG. 4, the electronic device 501 of FIG. 5, the electronic device 1201 of FIG. 12, the electronic device 1300 of FIGS. 13A and 13B, or the electronic device 1400 of FIG. 14A or 14B) may display a second intelligent agent screen for having a conversation with the intelligent agent on a first display 1662 by an (unintentional) input of the input unit in a state in which the electronic device is folded as shown in FIG. 16A. When the electronic device 1601 is unfolded within a designated time after an input of the input unit, the input of the input unit may be determined to be an unintentional input, for example, to be wrongly performed in an operation for changing the electronic device 1601 from the folded state to the unfolded state. When the input of the input unit is determined to be wrongly performed in the operation for changing the electronic device 1601 from the folded state to the unfolded state, the electronic device 1601 may display a screen of the unfolded state on a second display 1664 in an unfolded state as shown in FIG. 16B.

Figure 17:
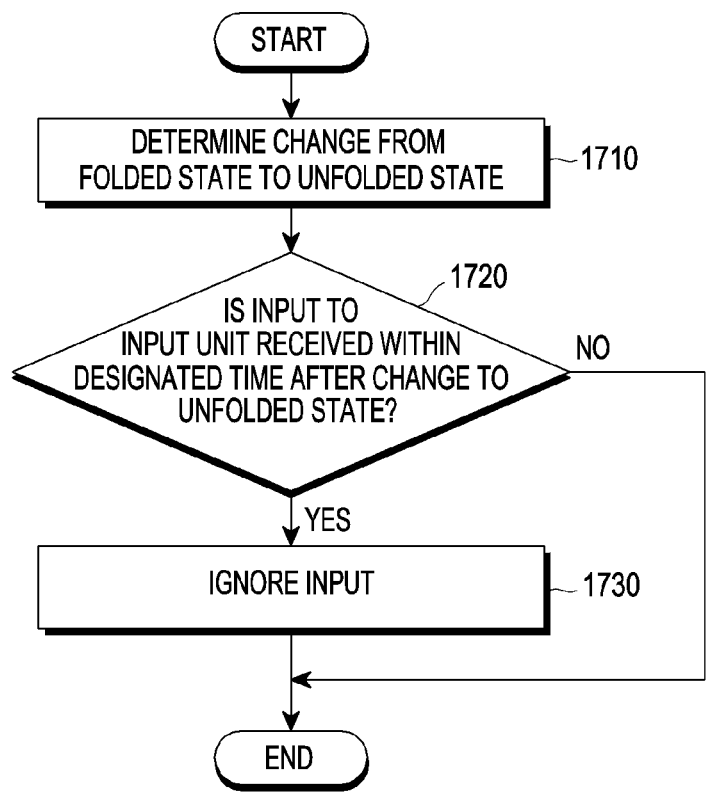
FIG. 17 is a flowchart illustrating an operation in a case in which an input is received at an input unit by a user after an electronic device according to various embodiments is unfolded by the user in a folded state.

FIG. 17 is a flowchart illustrating an operation in a case in which an input is received at an input unit by a user after an electronic device according to various embodiments is unfolded by the user in a folded state.

Referring to FIG. 17, operations 1710 to 1730 according to various embodiments may be understood as operations performed by a processor (e.g., the processor 150 of FIG. 2A, the processor 420 of FIG. 4, the processor 520 of FIG. 5, or the processor 1220 of FIG. 12) of an electronic device (e.g., the UE 100 of FIG. 1, 2A, 2B, or 3, the electronic device 401 of FIG. 4, the electronic device 501 of FIG. 5, the electronic device 1201 of FIG. 12, the electronic device 1300 of FIGS. 13A and 13B, or the electronic device 1400 of FIG. 14A or 14B). According to an embodiment, at least one of operations 1710 to 1730 may be omitted, some operations thereof may be reversed, or another operation may be added.

In operation 1710, the processor 1220 according to various embodiments may determine whether the electronic device 1201 is changed from a folded state to an unfolded state.

In operation 1720, when it is determined that the electronic device 1201 is changed from the folded state to the unfolded state, the processor 1220 according to various embodiments may determine whether an input to the input unit 1250 is received within a designated time after being unfolded. For example, the designated time may be a time within a few seconds (e.g. 1 second) immediately after being unfolded. According to various embodiments, the processor 1220 may determine, when the input to the input unit 1250 is received within the designated time after being unfolded, that the input is wrongly performed in order to prevent the input to the input unit 1250 from being unintentionally performed by a user while the electronic device 1201 is being unfolded.

In operation 1730, the processor 1220 according to various embodiments may ignore the received input in response to the reception of the input to the input unit 1250 within the designated time after the electronic device 1201 is unfolded. According to various embodiments, when the input to the input unit 1250 is received within the designated time after the electronic device is folded to prevent the input to the input unit 1250 from being unintentionally performed by the user while the electronic device 1201 is being unfolded, the processor 1220 may determine the input to be wrongly performed and may ignore the input.

Each of the above-described component elements of hardware according to the disclosure may include one or more elements, and the names of the corresponding elements may change based on the type of electronic device. The electronic device according to various embodiments of the disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the disclosure may be implemented by a command stored in a computer-readable storage medium in a programming module form. The instruction, when executed by a processor (e.g., the processor 150), may cause the one or more processors to execute the function corresponding to the instruction. The computer-readable storage medium may be, for example, the memory 140.

According to various embodiments, in a storage medium that stores instructions, the instructions may be configured, when executed by at least one circuit, to cause the at least one circuit to perform at least one operation, wherein the at least one operation includes operations of: performing user authentication based on biometric sensing information obtained through at least one biometrics sensor in response to an input to an input unit in a lock state; and in response to success of the user authentication, performing a first function when the duration of the input is less than or equal to the first threshold time, and performing a second function when the duration of the input exceeds the first threshold time.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added.

While the disclosure has been shown and described with reference to certain embodiments thereof, it will be understood by those skilled in the art that various changes in form and details may be made therein without departing from the spirit and scope of the disclosure as defined by the appended claims.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a display;
an input unit configured to include at least one biometrics sensor and a touch sensor;
at least one processor configured to be operatively connected to the display and the input unit; and
a memory configured to be operatively connected to the at least one processor,
wherein the memory stores instructions that cause, when executed, the at least one processor to:
identify an input through the at least one biometrics sensor and the touch sensor,
identify a lock state or an unlock state of the electronic device in response to the input, and
in response to the lock state:
identify a duration of the input and whether a state of the electronic device is changed from the lock state to the unlock state by performing user authentication based on biometric sensing information obtained through the at least one biometrics sensor in response to an input to the input unit in the lock state;
perform a first function when the duration of the input is less than or equal to a first threshold time and the state of the electronic device is changed from the lock state to the unlock state, and
perform a second function when the duration of the input exceeds the first threshold time and the state of the electronic device is changed from the lock state to the unlock state, and
in response to the unlock state:
perform a third function when the duration of the input is less than or equal to a second threshold time, and
perform the second function when the duration of the input exceeds the second threshold time,
wherein the first function includes a function of displaying an application screen that was being executed before the lock state, and
wherein the second function includes a function of executing an intelligent application and a function of displaying an intelligent application screen on the display.

2. The electronic device of claim 1, wherein the instructions are configured to cause the at least one processor to:
receive a first intelligent application screen or voice for providing information related to the intelligent application to the display as the intelligent application is executed; and
display a second intelligent application screen for having a conversation with the intelligent application.

3. The electronic device of claim 2, further comprising:
a foldable display,
wherein the instructions are configured to cause the at least one processor to determine a folded state or an unfolded state of the foldable display.

4. The electronic device of claim 3, wherein the instructions are configured to cause the at least one processor to:
determine whether the foldable display is changed to the unfolded state within a designated time after the input while the second intelligent application screen is displayed on the display in response to the input in the folded state of the foldable display; and
stop the displaying the second intelligent application screen on the display when the foldable display is changed to the unfolded state within the designated time after the input, and display a screen corresponding to the unfolded state on the foldable display.

5. The electronic device of claim 3, wherein the instructions are configured to cause the at least one processor to:
determine whether the input is received within a designated time after the foldable display is changed to the unfolded state when the foldable display is changed from the folded state to the unfolded state; and
ignore the input when the input is received within the designated time after the foldable display is changed to the unfolded state.

6. The electronic device of claim 1, wherein when the state of the electronic device is not changed from the lock state to the unlock state in response to a failure of the user authentication, the instructions are configured to cause the at least one processor to:
display a lock state screen on the display or ignore the input when the duration is less than or equal to the first threshold time, and display an unlock request message on the display when the duration exceeds the first threshold time in response to the failure of the user authentication.

7. The electronic device of claim 1, wherein the input unit includes at least one of a key, a button, or a predetermined region included in the display.

8. The electronic device of claim 1, wherein:
the at least one biometrics sensor includes a fingerprint recognition sensor, and
the instructions are configured to cause the at least one processor to perform the user authentication using fingerprint recognition sensing information of the fingerprint recognition sensor.

9. The electronic device of claim 1, wherein the first threshold time is a time designated for determining whether the input is a first input for performing the first function after successfully performing the user authentication or a second input for performing the second function after successfully performing the user authentication.

10. A method of performing a biometric authentication function and an intelligent application function using an input unit in an electronic device, the method comprising:
identifying an input through at least one biometrics sensor and a touch sensor;
identifying a lock state or an unlock state of the electronic device in response to the input;
in response to the lock state:
identifying a duration of the input and whether a state of the electronic device is changed from the lock state to the unlock state by performing user authentication based on biometric sensing information obtained through at least one biometrics sensor in response to an input to the input unit in the lock state;
performing a first function when the duration of the input is less than or equal to a first threshold time and the state of the electronic device is changed from the lock state to the unlock state, and
performing a second function when the duration of the input exceeds the first threshold time and the state of the electronic device is changed from the lock state to the unlock state; and
in response to the unlock state:
performing a third function when the duration of the input is less than or equal to a second threshold time, and
performing the second function when the duration of the input exceeds the second threshold time,
wherein the first function includes a function of displaying an application screen that was being executed before the lock state, and
wherein the second function includes a function of executing an intelligent application and a function of displaying an intelligent application screen on a display.

11. The method of claim 10, further comprising:
receiving a first intelligent application screen or voice for providing information related to the intelligent application to the display as the intelligent application is executed, and
displaying a second intelligent application screen for having a conversation with the intelligent application.

12. The method of claim 11, further comprising:
determining a folded state or an unfolded state of a foldable display included in the electronic device.

13. The method of claim 12, further comprising:
determining whether the foldable display is changed to the unfolded state within a designated time after the input while displaying the second intelligent application screen on the display in response to the input in the folded state of the foldable display; and
stopping the displaying of the second intelligent application screen on the display when the foldable display is changed to the unfolded state within the designated time after the input and displaying a screen corresponding to the unfolded state on the foldable display.

14. The method of claim 12, further comprising:
determining whether the input is received within a designated time after the foldable display is changed to the unfolded state when the foldable display is changed from the folded state to the unfolded state; and
ignoring the input when the input is received within the designated time after the foldable display is changed to the unfolded state.

15. The method of claim 10, further comprising:
when the state of the electronic device is not changed from the lock state to the unlock state in response to a failure of the user authentication, displaying a lock state screen on the display of the electronic device or ignoring the input when the duration is less than or equal to the first threshold time, and displaying an unlock request message on the display when the duration exceeds the first threshold time in response to the failure of the user authentication.

16. The method of claim 10, wherein the input unit includes at least one of a key disposed in the electronic device, a button disposed therein, and a predetermined region included in the display.

17. The method of claim 10, wherein the performing of the user authentication comprises performing the user authentication using fingerprint recognition sensing information of a fingerprint recognition sensor.

18. A non-transitory computer-readable medium embodying a computer program, the computer program comprising computer readable program code that, when executed by at least one processor of an electronic device causes the at least one processor to:
identify an input through at least one biometrics sensor and a touch sensor;
identify a lock state or an unlock state of the electronic device in response to the input;
in response to the lock state:
identify a duration of the input and whether a state of the electronic device is changed from the lock state to the unlock state by performing user authentication based on biometric sensing information obtained through at least one biometrics sensor in response to an input to an input unit in the lock state; and
perform a first function when the duration of the input is less than or equal to a first threshold time and the state of the electronic device is changed from the lock state to the unlock state, and perform a second function when the duration of the input exceeds the first threshold time and the state of the electronic device is changed from the lock state to the unlock state,
in response to the unlock state:
perform a third function when the duration of the input is less than or equal to a second threshold time, and
perform the second function when the duration of the input exceeds the second threshold time,
wherein the first function includes a function of displaying an application screen that was being executed before the lock state, and wherein the second function includes a function of executing an intelligent application and a function of displaying an intelligent application screen on the display.

* * * * *